US012641094B2

(12) United States Patent
Humphrey et al.

(10) Patent No.: US 12,641,094 B2
(45) Date of Patent: May 26, 2026

(54) INTERACTIVE CYBER-SECURITY USER-INTERFACE FOR CYBERSECURITY COMPONENTS THAT COOPERATES WITH A SET OF LLMS

(71) Applicant: Darktrace Holdings Limited, Cambridge (GB)

(72) Inventors: Dickon Humphrey, Cambridge (GB); Timothy Bazalgette, Knebworth (GB); John Boyer, Cambridge (GB); Jake Lal, Cambridge (GB); Philip Sellars, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 29 days.

(21) Appl. No.: 18/737,558

(22) Filed: Jun. 7, 2024

(65) Prior Publication Data

US 2024/0414191 A1     Dec. 12, 2024

Related U.S. Application Data

(60) Provisional application No. 63/472,227, filed on Jun. 9, 2023.

(51) Int. Cl.
G06F 21/56     (2013.01)
G06F 40/58     (2020.01)
(Continued)

(52) U.S. Cl.
CPC ..........  H04L 63/1416 (2013.01); G06F 40/58 (2020.01); H04L 63/1425 (2013.01); H04L 63/1441 (2013.01); H04L 63/205 (2013.01)

(58) Field of Classification Search
None
See application file for complete search history.

(56) References Cited

U.S. PATENT DOCUMENTS 10,268,821 B2    4/2019   Stockdale
10,419,466 B2    9/2019   Ferguson
(Continued)

FOREIGN PATENT DOCUMENTS

CN         116127046 A  *  5/2023  ......... G06F 16/3329
WO    WO-2017127850 A1  *  7/2017  ............. H04L 63/20

OTHER PUBLICATIONS

International Searching Authority, Notification of Transmittal of the International seach Report and the Written Opinion of the International Searching Authority, or the Declaration, Sep. 3, 2024, 15 pages.

*Primary Examiner* — Christopher B Robinson
(74) *Attorney, Agent, or Firm* — Rutan and Tucker, LLP

(57)     ABSTRACT

An interactive cyber-security user-interface for cybersecurity components can receive a voice input from a user as well as ii) a text input as a user input. The interactive cyber-security user-interface works with a set of differently trained LLMs to carry out tasks on behalf of the user input. The interactive cyber-security user-interface cooperates with the set of differently trained LLMs, which are grouped together to operate as an orchestrated system to provide different tasks. The tasks can include a collection of supplementary information, a summarization of cyber security information, translating a query in the natural human speech format into the required search syntax, how to integrate with an API, acting as a first line of support to user inquiries, a suggested response to a cyber security issue, etc. The interactive cyber-security user-interface for the cybersecurity components acts as the user interface for one or more of the cybersecurity components.

15 Claims, 9 Drawing Sheets

(51) Int. Cl.
      _G06N 3/09_          (2023.01)
      _H04L 9/40_          (2022.01)

(56)                    References Cited

U.S. PATENT DOCUMENTS

| | | | |
|---|---|---|---|
| 10,701,093 B2 | 6/2020 | Dean | |
| 2020/0213336 A1* | 7/2020 | Yu ........................ | G06N 3/0499 |
| 2020/0244673 A1 | 7/2020 | Stockdale | |
| 2021/0273958 A1 | 9/2021 | McLean | |
| 2021/0336889 A1 | 10/2021 | Yaswi et al. | |
| 2022/0014547 A1* | 1/2022 | Hasan .................... | G06N 5/025 |
| 2022/0180056 A1* | 6/2022 | Hong ................... | G06N 3/0455 |
| 2022/0197923 A1* | 6/2022 | Jeong ..................... | G06N 3/045 |
| 2022/0263860 A1* | 8/2022 | Crabtree ............. | H04L 63/1425 |
| 2023/0098783 A1* | 3/2023 | Zaremoodi ............ | G06N 3/044 |
| | | | 704/243 |
| 2023/0179622 A1 | 6/2023 | Underwood er al. | |
| 2023/0315722 A1* | 10/2023 | Saxe ................... | G06F 16/3322 |
| | | | 726/1 |

* cited by examiner

FIG. 6  Network

INTERACTIVE CYBER-SECURITY USER-INTERFACE FOR CYBERSECURITY COMPONENTS THAT COOPERATES WITH A SET OF LLMS

NOTICE OF COPYRIGHT

RELATED APPLICATION

This application claims priority under 35 USC 119 to U.S. provisional patent application 63/472,227, titled "CYBER SECURITY SYSTEM" filed Jun. 9, 2023, which the disclosure of such is incorporated herein by reference in its entirety.

FIELD

Cyber security and in an embodiment use of Artificial Intelligence in cyber security.

BACKGROUND

Cybersecurity attacks have become a pervasive problem for enterprises as many computing devices and other resources have been subjected to attack and compromised. A "cyberattack" constitutes a threat to security of an enterprise (e.g., enterprise network, one or more computing devices connected to the enterprise network, or the like). As an example, the cyberattack may be a cyber threat against the enterprise network, one or more computing devices connected to the enterprise network, stored or in-flight data accessible over the enterprise network, and/or other enterprise-based resources. This cyber threat may involve malware (malicious software) introduced into a computing device or into the network. The cyber threat may originate from an external endpoint or an internal entity (e.g., a negligent or rogue authorized user). The cyber threats may represent malicious or criminal activity, ranging from theft of credential to even a nation-state attack, where the source initiating or causing the security threat is commonly referred to as a "malicious" source. Conventional cybersecurity products are commonly used to detect and prioritize cybersecurity threats (hereinafter, "cyber threats") against the enterprise, and to determine preventive and/or remedial actions for the enterprise in response to those cyber threats.

SUMMARY

Methods, systems, and apparatus are disclosed for an Artificial Intelligence-based cyber security system.

An interactive cyber-security user-interface for cybersecurity components can be configured to receive a voice input from a user as well as ii) a text input as a user input. The interactive cyber-security user-interface for the cybersecurity components works with a set of two or more differently trained LLMs to carry out tasks on behalf of the user input. The interactive cyber-security user-interface for the cyber-security components cooperates with the set of two or more differently trained LLMs, which are grouped together to operate as an orchestrated system to provide two or more different tasks. The tasks can include a collection of supplementary information, a summarization of cyber security information, translating a query in the natural human speech format into the required search syntax, how to integrate with an API, acting as a first line of support to user inquiries, a suggested response to a cyber security issue, etc. The interactive cyber-security user-interface for the cybersecurity components acts as the user interface for one or more of the cybersecurity components. The cybersecurity components can include i) a cyber security appliance with a cyber threat detect engine to detect a cyber threat in one or more of an email system, an Information Technology network, a cloud network, and any combination of these, ii) a proactive threat notification service to publicize new and ongoing cyber threats, iii) a cyber threat autonomous response engine to take one or more actions to mitigate a detected cyber threat, iv) a cyberattack simulator to simulate a cyberattack, v) a cyber-attack restoration engine to restore network components back to an operational state prior to the cyberattack, and vi) an artificial intelligence-based cyber threat analyst module to investigate a chain of two or more minor anomalies linked to each other over a time frame of examination spanning two or more days.

These and other features of the design provided herein can be better understood with reference to the drawings, description, and claims, all of which form the disclosure of this patent application.

DRAWINGS

The drawings refer to some embodiments of the design provided herein in which.

Figure 8:
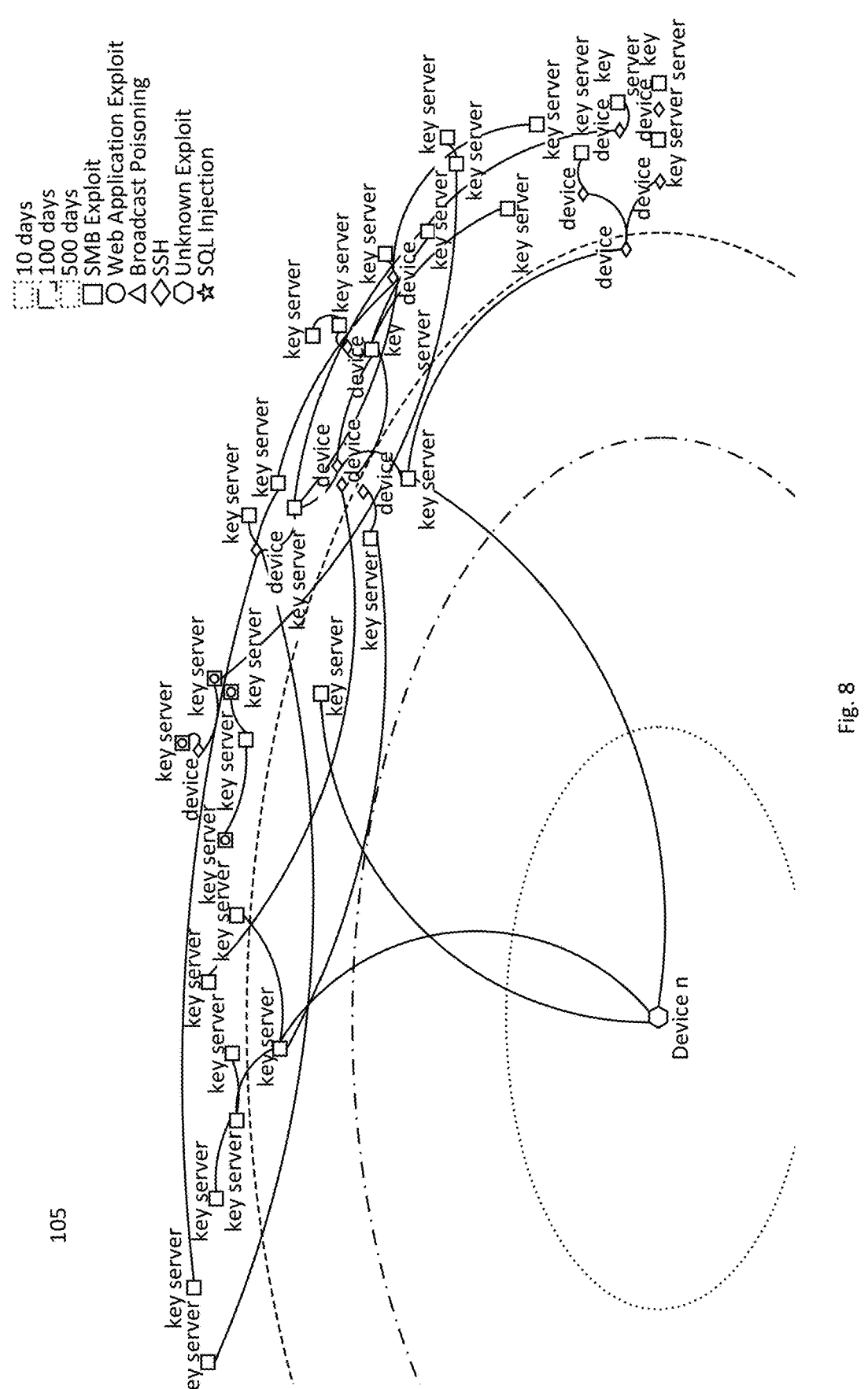

FIG. 8 illustrates a diagram of an embodiment of the cyber-attack simulator and its Artificial Intelligence-based simulations constructing an example graph of nodes in an example network and simulating how the cyberattack might likely progress in the future tailored with an innate understanding of a normal behavior of the nodes in the system being protected and a current operational state of each node in the graph of the protected system during simulations of cyberattacks.

Figure 9:
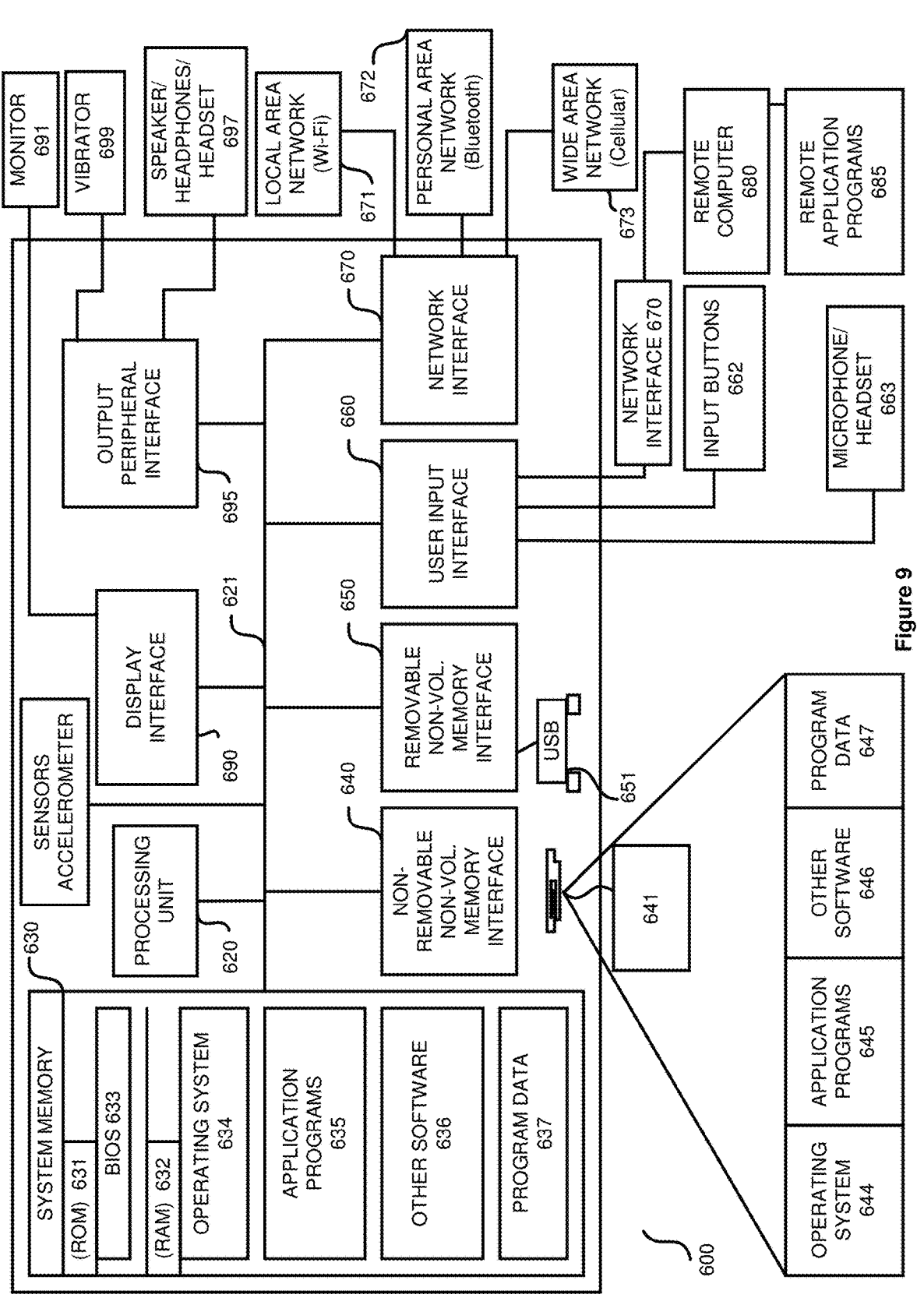

FIG. 9 illustrates a block diagram of an embodiment of one or more computing devices that can be a part of the Artificial Intelligence-based cyber security system including the multiple Artificial Intelligence-based engines and the interactive cyber-security user-interface for cybersecurity components with its LLMs discussed herein.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Figure 1:
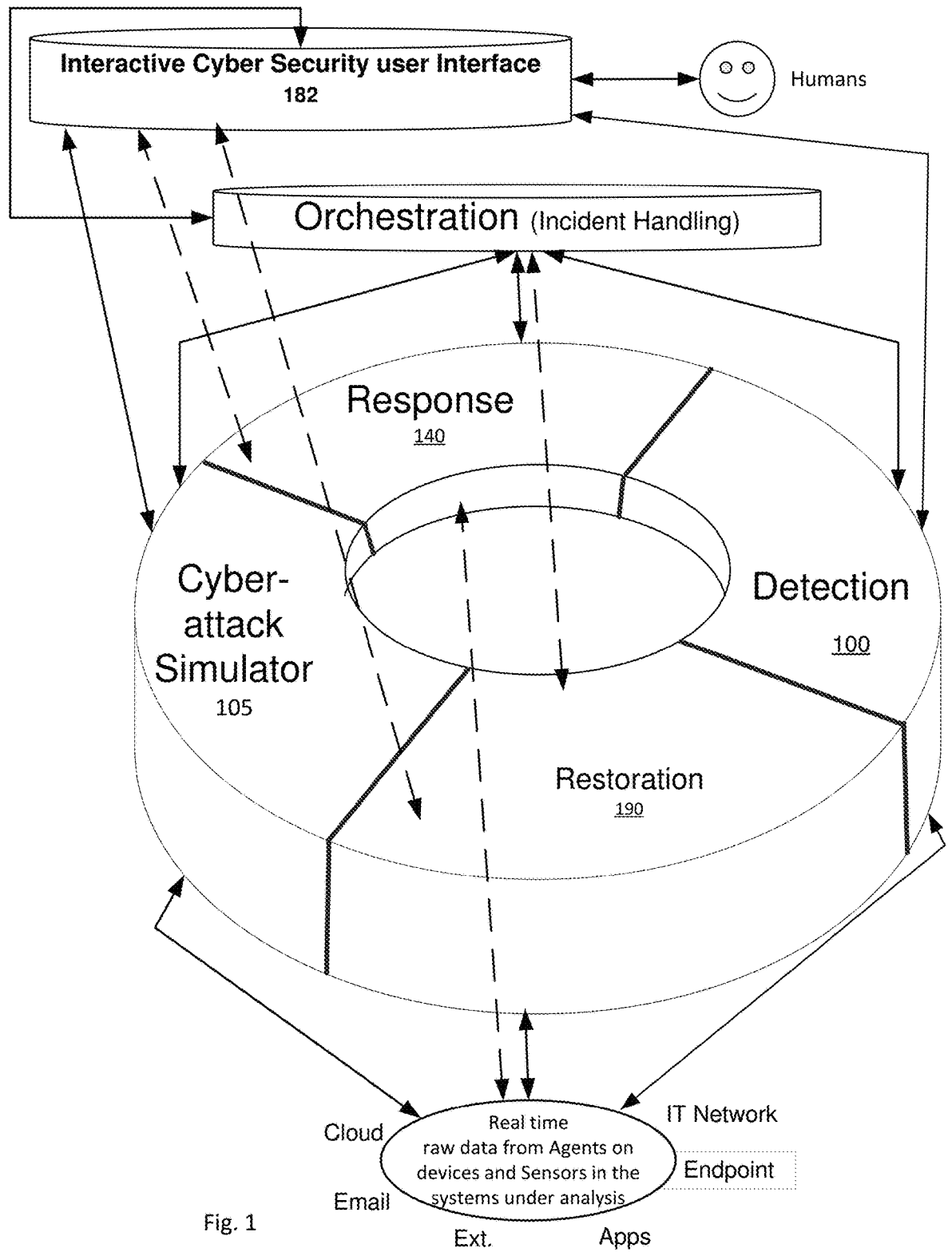
FIG. 1 illustrates a diagram of an embodiment of the interactive cyber-security user-interface for the cybersecurity components to work with a set of two or more differently trained large language models (LLMs) to carry out tasks on behalf of the user input.

FIG. 1 illustrates a diagram of an embodiment of the interactive cyber-security user-interface for the cybersecurity components to work with a set of two or more differently trained large language models (LLMs) to carry out tasks on behalf of the user input. The interactive cyber-security user-interface for cybersecurity components 182 is an ease-of-use tool that uses a set of complex LLMs 111a-111e to understand complex textual/voice based requests. The interactive cyber-security user-interface for the cybersecurity components 182 is also capable of receiving a user input from text and/or a mouse when acting as a user interface into each of the different cyber security components 100, 105, 120, 140, and 190.

The interactive cyber-security user-interface for the cybersecurity components 182 cooperates with one or more of the cybersecurity components 100, 105, 120, 140, and 190. The cybersecurity components can include i) a cyber security appliance 100 with a cyber threat detect engine to detect a cyber threat in one or more of an email system 791, an Information Technology network 792, a cloud network, and any combination of these, ii) a proactive threat notification service to publicize new and ongoing cyber threats, iii) a cyber threat autonomous response engine 140 to take one or more actions to mitigate a detected cyber threat, iv) a cyberattack simulator 105 to simulate a cyberattack, v) a cyber-attack restoration engine 190 to restore network components back to an operational state prior to the cyberattack, vi) an artificial intelligence-based cyber threat analyst module 120 to investigate a chain of two or more minor anomalies linked to each other over a time frame of examination spanning two or more days, and vii) other components.

The interactive cyber-security user-interface for the cybersecurity components 182 cooperates with the set of two or more differently trained LLMs 111a-111e, which are grouped together to operate as an orchestrated system to provide two or more different tasks. The tasks can include a collection of supplementary information, a summarization of cyber security information, a suggested response to a cyber security issue, and other functions.

Figure 2:
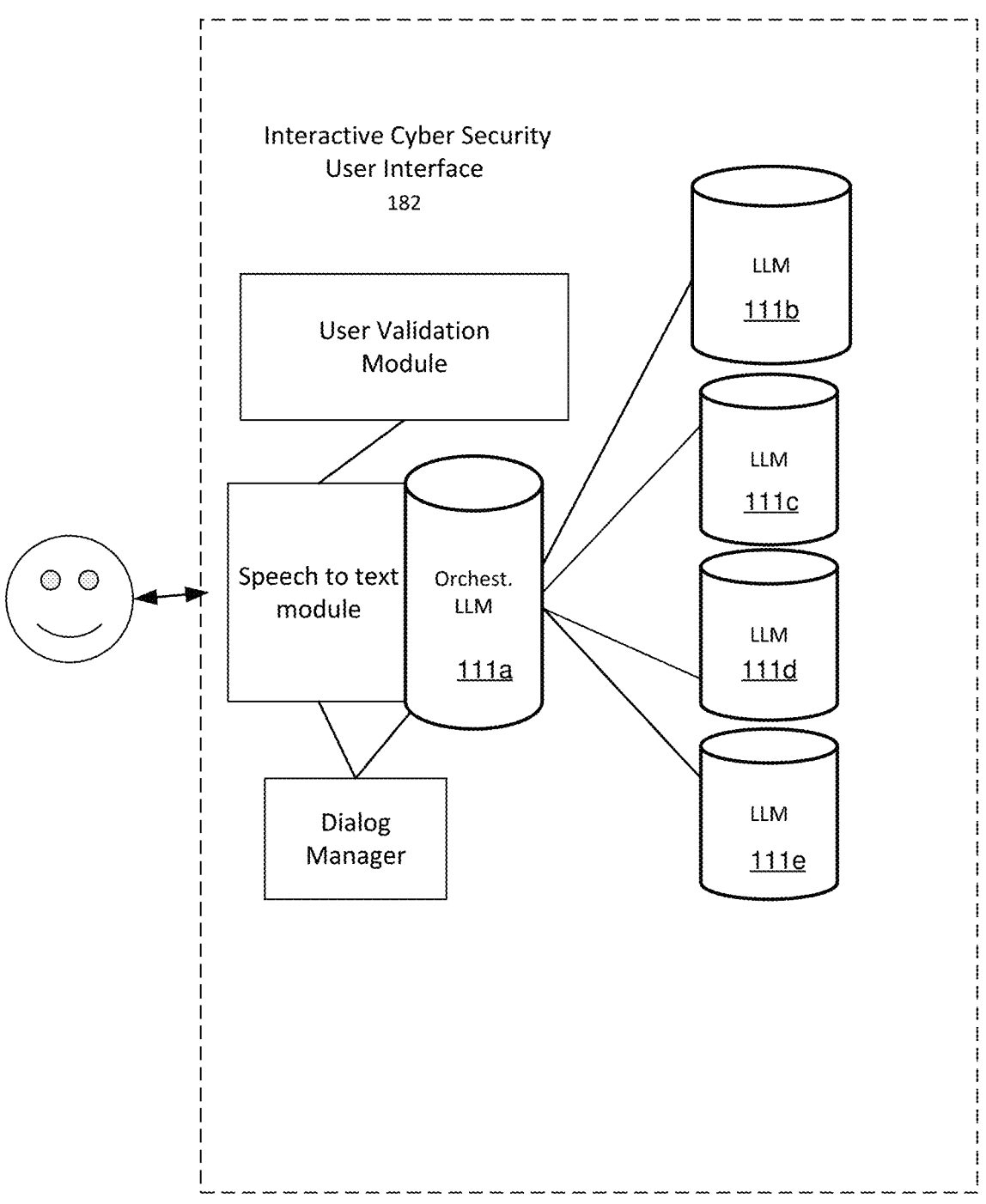
FIG. 2 illustrates a diagram of an embodiment of an interactive cyber-security user-interface for cybersecurity components that is configured to receive at least a voice input from a user as well as ii) a text input and/or a mouse/button on a touch screen as a user input and cooperates with two or more LLMs.

FIG. 2 illustrates a diagram of an embodiment of an interactive cyber-security user-interface for cybersecurity components that is configured to receive at least a voice input from a user as well as ii) a text input and/or a mouse/button on a touch screen as a user input and cooperates with two or more LLMs.

The human cybersecurity analyst can interact with the interactive cyber-security user-interface for cybersecurity components 182 using the set of LLMs 111a-111e. The interactive cyber-security user-interface for cybersecurity components 182 has a speech to text module, an orchestrator LLM 111a trained to be a natural language processor as well as being an orchestrator, a dialog manager, one or more task dedicated LLMs 111b-111e trained on slightly different things including query building and search functions, and a user validation module to validate authentication credentials and permissions of a user. The interactive cyber-security user-interface for cybersecurity components 182 can be used with any of the cyber security components 100, 105, 120, 140, and 190.

The interactive cyber-security user-interface (e.g. a chatbot) 182 can be a combination of software and computing hardware on a platform that enables machines to communicate with humans in a natural conversational manner, and vice versa. The interactive cyber-security user-interface 182 can have numerous uses in different scenarios as the interactive cyber-security user-interface answers questions, communicates with both the human users and the machine learning and other functionality in the cyber security components 100, 105, 120, 140, and 190 and/or third-party service to provide better insights about the users' needs.

The interactive cyber-security user-interface (e.g. a chatbot) 182 receives supplied input from a user, whether it be via written, voice input, or other input source, such as the entire chat thread from a chat service via the mobile app on a user's smart device, etc. The interactive cyber-security user-interface 182 can convert the speech to text and/or text from the user into supplied text that is fed into both an orchestrator LLM 111a that is also trained on natural language processing to generate a specific question being asked as well as a dialog manager to keep track of the background contextual information associated with the question being asked. A speech to text module receives the text and audio file, which feeds its output to the orchestrator LLM 111a to perform natural language processing in order to derive what the user said and what the user intended. Also, the dialog manager module manages and keeps track of a state of a dialog with a user. The orchestrator LLM 111*a* provides the output of the natural language processing as contextually modified by the dialog manager of the user input into a computer understandable query fed into one or more of the task dedicated LLMs 111*b*-111*e*.

The interactive cyber-security user-interface 182 cooperating with the orchestrator LLM 111*a* allows the human to be able to communicate in a natural form and then the orchestrator LLM 111*a* abstracts and converts that input with available contextual information into a computer understandable query with relevant contextual information and in a form that a computer can understand and operate upon. The interactive cyber-security user-interface 182 is not reliant on the human clicking around on multiple menus and icons but rather allows a human to interact in a way that is a natural interaction (e.g. verbally saying what the user wants), which is then fed into the natural language processing functionality of the orchestrator LLM 111*a* along with an input from the dialog manager module to keep track of the state and context of the conversation with the user. The orchestrator LLM 111*a* can feed its output into the different task dedicated LLMs 111*b*-111*e* for them to generate a query for information and/or to action some other action on the supplied information. The interactive cyber-security user-interface 182 via the dialog manager and its NLP cooperatively engage in a dialog with the user until the interactive cyber-security user-interface 182 has enough contextual information to make an educated query regarding what the end user asking or needs to make an interpretation on and then know what the one or more corresponding cyber security components 100, 105, 120, 140, and 190 are needed to query in order to obtain all of the relevant information available associated with that query and then supply a comprehensive relevant answer to what the end user is asking or needs for interpretation on.

The orchestrator LLM 111*a* of the set of two or more differently trained LLMs 111*a*-111*e* can receive the user input of voice and/or text, and then is trained to apply a language comprehension functionality on the user input (including the contextual information supplied by the dialog manager and possibility additional contextual information submitted by the user when supplying the user inquiry) in order generate a consistent version of a request indicated by the user input, which then is fed as an output to one or more of a set of task dedicated LLMs 111*b*-111*e* to be invoked or not. The orchestrator LLM 111*a* is generically trained on receiving an end user's voice and/or text based input along with any contextual information, and then analyzing the language to understand what a person/user is asking. The orchestrator LLM 111*a* can be generically trained on receiving an end user's voice and/or text based input, in a number of different dialects and accents within that human language as well as conceptually expressed with literally different words but aimed at achieving a similar objective by applying its generic language comprehension, and then feeds a consistent output to the set of tasks dedicated LLMs for them to either be invoked or not. One or more of the task dedicated LLMs 111*b*-111*e* receive the request indicated by the user input and then are trained to carry out the request with one or more of the cybersecurity components 100, 105, 120, 140, and 190.

The training of the generic language comprehension focused orchestrator LLM 111*a* has been fined-tuned to also act as an orchestrator for the tasks performed by the set of task dedicated LLMs 111*b*-111*e*. Thus, the orchestrator LLM 111*a* is further trained to orchestrate the tasks performed by the set of task dedicated LLMs 111*b*-111*e*. The orchestrator LLM 111*a* performs the generic language comprehension functionality to understand the end user's request, translates that input into a consistent output format, and then invokes one or more additional task dedicated LLMs 111*b*-111*e* that will be able to best achieve the purpose of the end user request.

The interactive cyber-security user-interface for cybersecurity components 182 utilizes a series of interconnected large language models 111*a*-111*e* grouped together to operate as an orchestrated system to provide contextual data information from third party sources summarization and suggestion by humans. The interactive cyber-security user-interface for cybersecurity components 182 is a natural language interface that can be supplied via voice and/or text along as well as with this other contextual information obtained by the system.

Each of the task dedicated LLMs 111*b*-111*e* can be trained on generative AI coding to generate code to execute at least one of i) generate a query for information to specific components in the cyber security system and ii) send a command to, for example, API's of each of the multiple different components 100, 105, 120, 140, and 190 of the cyber security system and return additional information.

The set of task dedicated LLMs 111*b*-111*e* are also part of the set of two or more differently trained LLMs 111*a*-111*e*. The set of task dedicated LLMs 111*b*-111*e* includes two or more of the following 1) a first task dedicated LLM 111*b* trained to act as an assistant that submits data to at least one of i) a third-party service 181 and ii) the cybersecurity components 100, 105, 120, 140, and 190 using training on how to integrate with an API of that third party service 181 or cybersecurity component 100, 105, 120, 140, and 190, such as using pre-engineered prompts on how to integrate, to obtain the collection of the supplementary information; 2) a second task dedicated LLM 111*c* trained on a search syntax required by an advanced search function offered by at least one of i) the third-party service and ii) the cybersecurity components to allow users to query in natural human speech in order to obtain security information such as detailed log data, via the second task dedicated LLM 111*c* being trained to translate the query in the natural human speech into the search syntax required, 3) a third task dedicated LLM 111*d* trained to be fed a history of cyber security breaches/model breaches and their severity scores as well as the current cyber threats trending currently, and then the third task dedicated LLM 111*d* produces both a summarization of the cyber security information including the model breaches and the trends as well as provides any recommendations, 4) a fourth task dedicated LLM 111*e* trained to act as a first line of support for user inquiries to provide a suggested response to the cyber security issue. The set of LLMs 111*a*-111*e* can work in tandem to provide an 'on demand' simplistic summarization of large quantities of data in the context of these detections and provide guidance on how humans have commented on and/or resolved this problem previously based upon our wider knowledge of historic occurrences.

The set of LLMs 111*a*-111*e* lets the system use lots of specialized LLM components rather than trying to make one generic LLM component that is able to do every task. So, it is this utilization of multiple specialized large language models 111*a*-111*e* to achieve a goal which is acting as an assistant to an end user to provide them with supplementary information and to automate out the tedium that the user would have to perform as a result as part of a detection and a human needed to do these mundane tasks. In general, it can be better to use a smaller LLM trained on specific tasks rather than one big LLM that performs multiple tasks but generally only does a mediocre job on performing every task. The system can use a set of smaller LLMs trained on specific tasks 111b-111e and an orchestration layer LLM 111a purposely trained to achieve certain tasks. The orchestrator LLM 111a was trained to turn voice into what a user wants and then turn that into which individual task LLM 111b-111e should I call upon to satisfy what the user wants? The orchestrator LLM 111a selects one or more appropriate task trained LLMs 111b-111e that are capable of performing the needed task to answer the user's query.

Referring back to FIG. 1, a fourth task dedicated LLM 111e is part of the set of two or more differently trained LLMs 111a-111e. The fourth task dedicated LLM 111e is trained to act as a first line of support for user inquiries to provide a suggested response to the cyber security issue. The fourth task dedicated LLM 111e has been trained on a historic corpus of user inquiries submitted to an expert human cyber analyst to understand how the expert human cyber analyst would resolve the user inquiries and then supply the suggested response to the cyber security issue to the user while the user is waiting for an actual human cyber analyst to pick up and review their inquiry. The fourth task dedicated LLM 111e can be trained on a historic corpus of prepared 'ask the expert' queries to understand how a human analyst would resolve a specific detection scenario and then supply that information to the end user while the end user may be waiting for an actual human cyber analyst to pick up and review their query into an ask expert human cyber analyst. The interactive cyber-security user-interface for cybersecurity components 182 cooperating with the fourth task dedicated LLM 111e allows the system to provide intelligent remediation and forensic suggestions while waiting for a human expert to make those suggestions.

The fourth task dedicated LLM 111e is also trained on understanding cybersecurity products and troubleshooting issues. The fourth task dedicated LLM 111e is trained on an entire corpus of cyber security documentation associated with the cybersecurity components, as well as all interactions between the cyber security support and clients (tickets) and a large corpus of interactions with actual expert cyber experts. For example, "Where can I find x in the documentation? I have this series of model breaches how have others responded to a similar set of model breaches?" The cyber security system can use the fourth task dedicated LLM 111e provide a first line of support for client queries about either 1) how the different cyber security products and services work and troubleshooting issues with those products and services as well as 2) provide cyber analyst answers regarding cyber security techniques and current cyber threat landscapes and current active cyber threats. For instance, clients can inquire about the functionality and configuration of security software, seek guidance on implementing best practices, or troubleshoot common issues. The fourth task dedicated LLM 111e can provide step-by-step instructions, explain complex concepts in a user-friendly manner, and offer real-time support. This helps alleviate the burden on the human support personnel and enables users to access timely and accurate information. Thus, the fourth task dedicated LLM 111e is trained to act as a first line of support for user queries regarding at least one of 1) troubleshooting issues with the cybersecurity components, 2) providing cyber analyst answers as a suggested response to the cyber security issue to the user, and 3) a current cyber threat landscape and current active cyber threats, while the user is waiting for an actual human cyber analyst to pick up and review their inquiry.

The fourth task dedicated LLM 111e answers user queries about cyber security issues including how to investigate and/or triage threats in their network. In an embodiment, the fourth task dedicated LLM 111e has been trained on a corpus of past user inquiries and expert responses but can also reference a datastore of past and current 'ask the expert' inquiries and expert responses.

The fourth task dedicated LLM 111e can also be used to re-write a draft of a written response from an expert human cyber analyst and support the suggested responses by intelligently adding context into the written response from an expert human cyber analyst before posting (almost like an assistant for the expert human cyber analyst).

Training

During the training of the fourth task dedicated LLM 111e to act as a first line of support for client queries, the system has to retrieve all the corpus of past user inquiries and expert responses from the datastore. Next, the training of the fourth task dedicated LLM 111e starts with an existing trained LLM model that is good at general language, and then fine-tunes the training of this existing trained LLM model by using the training data of past user inquiries and expert responses as well as the cyber security context in general from, for example, a large amount of cyber security incident reports created by human cyber analysts to produce the refined fourth task dedicated LLM 111e trained to act as a first line of support for client queries. The training includes how to cooperate with the other task dedicated LLMs 111b-111e to obtain any additional information needed to answer the user inquiry from, for example, internal cyber security components 100, 105, 120, 140, and 190 as well as from third party sources/services 181. The fourth task dedicated LLM 111e can also cooperate with the other task dedicated LLMs 111b-111e to obtain additional information to be a full response to the threat landscape.

As discussed, the fourth task dedicated LLM 111e is pre-trained on a large amount of linguistic data, and has a generic understanding of language that is then fine-tuned for specific tasks. In an example, the trained fourth task dedicated LLM 111e can do the latent derelict allocation of comments, the gathering of tags from various sources, and then associate group tags as part of this process as follows.

A. Using Bert Text Classification Applied to Incident Response Comments to Automatically Assess the Action Taken for An Event from machine learning analysis of text.

The training system can take comments 1) from internal cyber security analysts' incident reports and 2) from inquiries from user and corresponding expert human analyst responses, and then group them using a generative probabilistic model of a corpus such as Latent Dirichlet Allocation. The Latent Dirichlet Allocation can, for example, extract topics from a given corpus. Then having assigned categories to these groups, use the labelled data to train a BERT Text Classification machine learning.

A. Process to Create Categories i. The process uses a generative probabilistic model on a corpus of text, such as Latent Derelict Allocation, on comments to assign 'user inquiries and corresponding expert responses to the user inquiries' into a set number of categories such as five categories. The fourth task dedicated LLM 111e takes the text in an unbiased way, and clusters it together.

ii. The fourth task dedicated LLM 111e can be an AI based deep learning transformer neural network trained in language understanding (e.g., BERT-Bidirectional Encoder Representations from Transformers language model).

iii. The fourth task dedicated LLM 111e learns the language associated with each of the applied categories. After the LLM clusters user inquiries and corresponding expert responses to the user inquiries into a set number of categories together, then the LLM learns/deciphers what that cluster represents by the words that are in that clustered group. The process uses Bert Text Classification applied to the categorized incident response comments and/or inquiries from user and expert analyst responses to allow the automatic assessment of the action taken for an event from machine learning analysis of text.

iv. During deployment after the training, the trained fourth task dedicated LLM 111e can then be used to assess the likely category of subsequent incident response comments.

B. Categorization of Threat Intel Indicators of Compromise Based on Comment Text and Associated Tags The process can autogenerate categories into which a particular Indicator of Compromise (IoC) falls based on the tags and associated comment texts in an existing cyber security repository, such as Researcher.

B. Process i. The process uses the Latent Derelict Allocation of comments to assign comments into ~5 categories. The process takes the text in an unbiased way, and clusters the text together based on similarity, and then the process determines what that cluster represents by the words that are in that clustered group. The above process can create the categories and automatically allow the LLM to learn/decipher what that cluster represents by the words that are in it.

ii. Next, the process can gather appropriate/corresponding tags from various existing cyber security repository sources such as Researcher, Alienvault, Yeti, VT, Google, UrlHaus.

iii. Next, the process can associate groups with the corresponding tags and then use the labelled data to train a language aware neural network, such as BERT, in the fourth task dedicated LLM 111e.

iv. The trained fourth task dedicated LLM 111e can then perform classification of a new IoC by analyzing associated comments/tags of the new IoC.

The Latent Derelict Allocation and the BERT classifications are one end of understanding the text, the voice, and other input from an end user when querying the interactive cyber-security user-interface for cybersecurity components 182 cooperating with the fourth task dedicated LLM 111e trained to act as a first line of support for client inquiries. The fourth task dedicated LLM 111e is trained to act as a first line of support for client inquiries by responding to the initial query with a generated answer. The two step process of 1) the categorization of those questions on one side using the BERT classifications and the Latent Derelict Allocation and then 2) on the other side, when you know this is a particular category of question, then you can better understand the question and provide the appropriate response to the query.

The interactive cyber-security user-interface for cybersecurity components 182 that cooperates with the LLMs helps human cyber security personnel to better understand the threats and risks facing their organization. The interactive cyber-security user-interface for cybersecurity components 182 that cooperates with the LLMs also helps users make better decisions for cyber threat hunting faster, reducing response time to critical incidents. Thus, in terms of functionality, the interactive cyber-security user-interface for cybersecurity components 182 that cooperates with the LLMs provides a wide range of capabilities to support cybersecurity personnel in their day-to-day operations. One of the primary roles is to assist in risk assessment and other cyber security issues by answering questions and providing real-time insights. By leveraging the speed and computational power of AI, combined with human expertise and intuition, security teams can gain a significant advantage. The interactive cyber-security user-interface for cybersecurity components 182 that cooperates with the LLMs serves as a force multiplier, augmenting the capabilities of the user's security analysts and enabling them to detect and respond to threats more efficiently.

Figure 6:
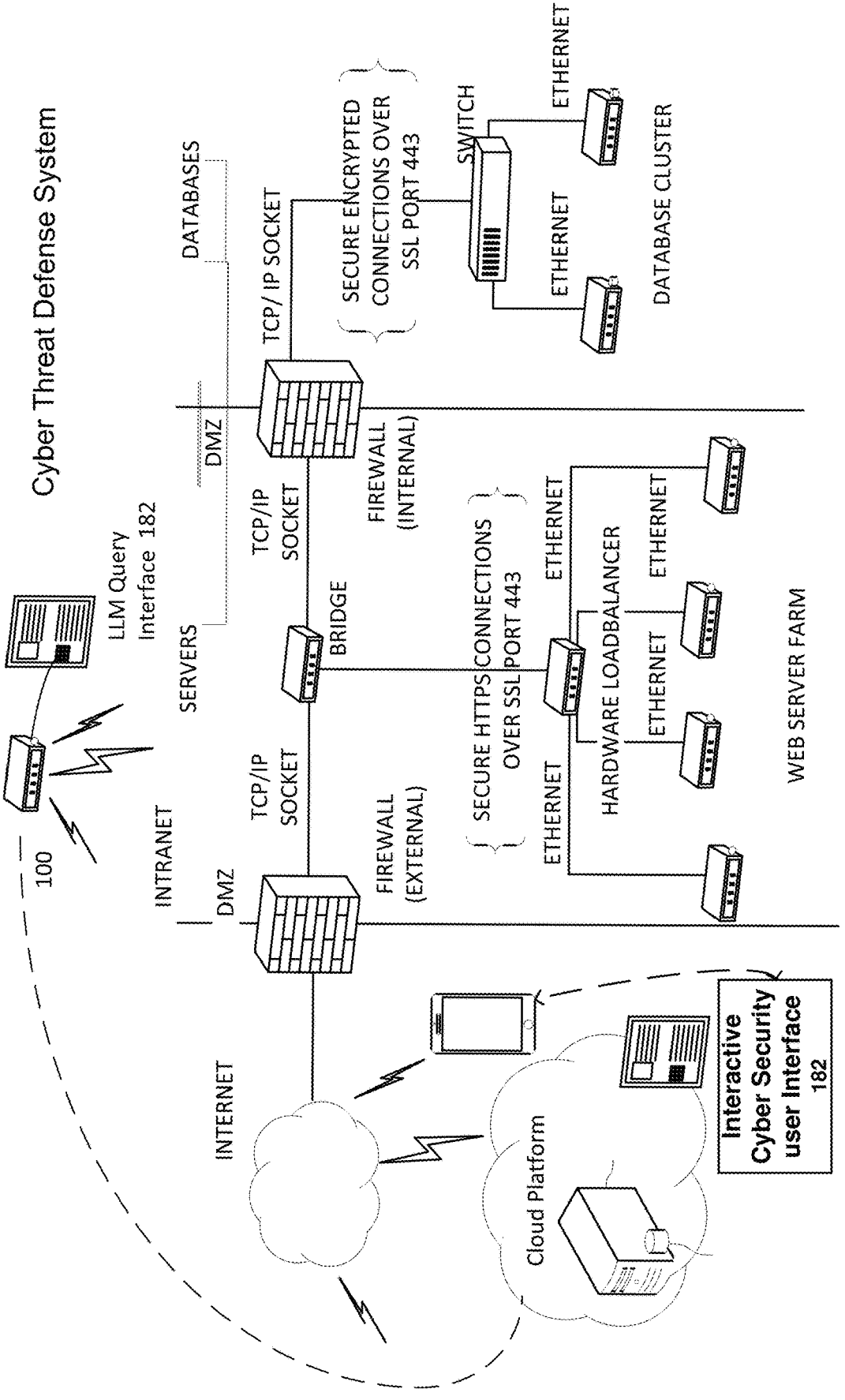
FIG. 6 illustrates a diagram of an embodiment of the interactive cyber-security user-interface for cybersecurity components used with a mobile app for the cyber security system on a mobile device, as well as a threat visualizer user interface for the cyber security appliance.

Referring to FIG. 6, in an embodiment, the interactive cyber-security user-interface for cybersecurity components 182 is mainly used with a mobile app for the cyber security system on a mobile device, and a threat visualizer user interface for the cyber security appliance 100. The set of LLMs may operate in the cloud platform and/or partially in the cloud and partially on the cyber security appliance and/or mobile device hosting the mobile app. When a particular LLM is specifically trained, well-tuned on a few tasks, and derived from cyber security scraped data specifically, then the LLM can be small enough to sit resident in a memory space of a cyber security appliance 100 and not take up too much of the compute cycles. The interactive cyber-security user-interface for cybersecurity components 182 on the mobile app is limited by the mobile device's computing power and may just capture the voice, text, and other files supplied by the user and then send the voice wave files and other files off to either the cloud platform or to the local cyber security appliance 100 for processing by the remainder of the interactive cyber-security user-interface for cybersecurity components 182 with its LLMs. The mobile app can securely communicate with that cyber security appliance, which then can use its secure communication links to the back end cloud platform to compute and/or take responsibility for processing some of these functions.

Note, the interactive cyber-security user-interface directly improves the operation of the computing hardware device by using multiple LLMs each specializing in different things. The smaller and more specialized the LLM onto a particular subject matter, such as cyber security restoration or cyber security threat in general, then that specialized LLM will create a relevant textual response with far less CPU cycles, power consumption, and memory usage than a single larger LLM that has ingested information on a broad spectrum of different topics. Thus, the set of LLMs allow for a more efficient, less CPU cycles and energy consumption, less memory space needed to store the model, etc. One extremely large LLM implementation is so vast because the amount of data contained and trained upon as well as the amount of parallel neural networks needed (because of the unlimited amount of possibilities that need to be evaluated relative to each other) to arrive at an outcome, that single LLM consumes vast amounts of power and processing cycles to supply an answer back within the timeframe of a human's capacity for an attention span.

Figure 3:
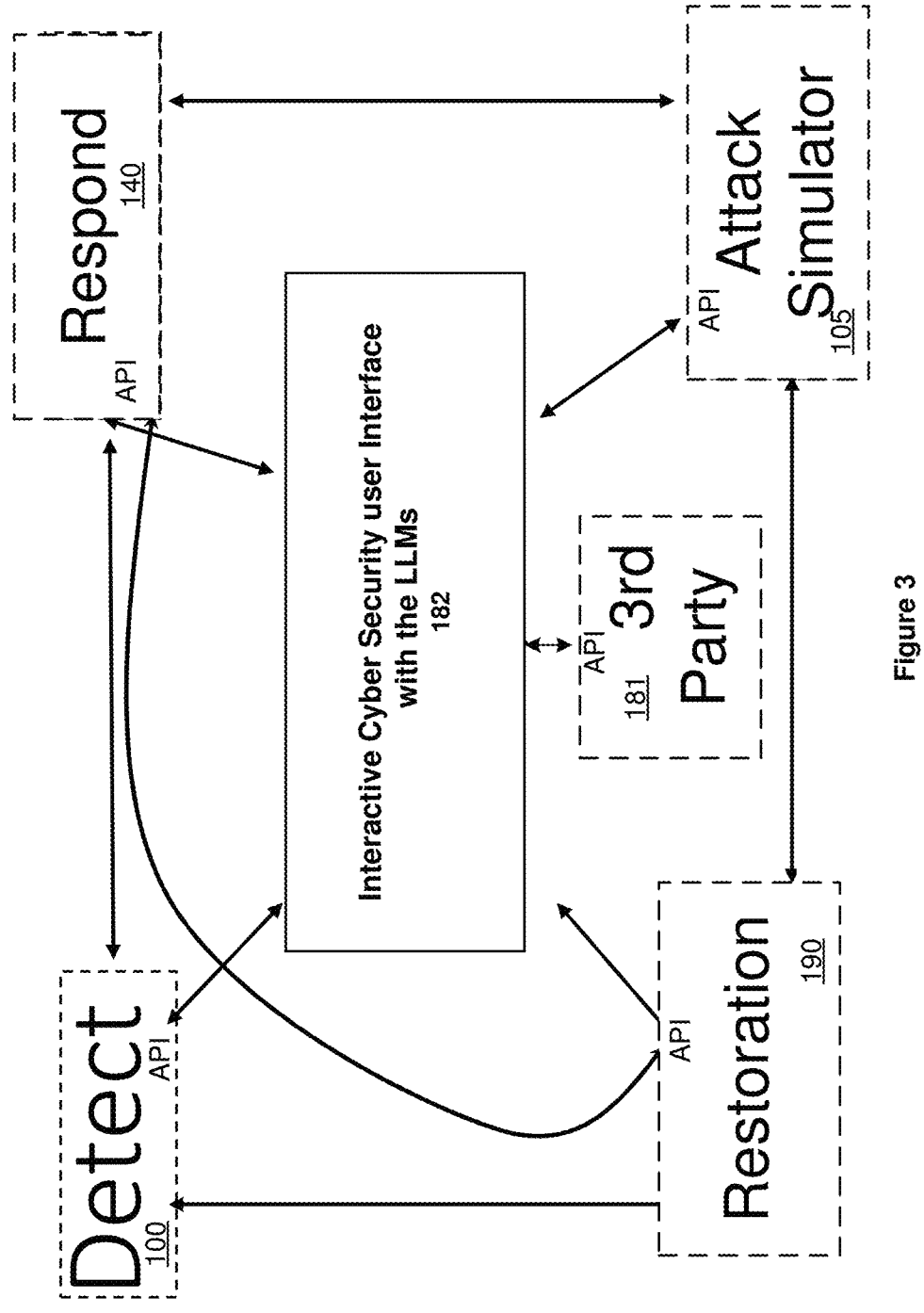
FIG. 3 illustrates a diagram of an embodiment of the interactive cyber-security user-interface for the cybersecurity components to cooperate with one or more of the cybersecurity components via APIs.

FIG. 3 illustrates a diagram of an embodiment of the interactive cyber-security user-interface for the cybersecurity components to cooperate with one or more of the cybersecurity components via APIs. The interactive cyber-security user-interface 182 into one or more of cyber security components 100, 105, 120, 140, and 190 with its set of different LLMs 111a-111e can reach out to different third party services, for example, Microsoft Security Copilot, and the third party's LLM interacts with the LLMs from the interactive cyber-security user-interface 182. Each of the LLMs (the first task dedicated LLM 111*b* trained to integrate with an API, the second task dedicated LLM 111*c* trained on the search syntax required by the third-party service and/or the cybersecurity components, the third task dedicated LLM 111*d* trained to summarize and prioritize model breaches, and the fourth task dedicated LLM 111*e* trained to act as a first line of support for user inquiries) can reach out and ask the third party service 181, such as Microsoft Security Copilot, to return information back. Likewise, the interactive cyber-security user-interface for the cybersecurity components 182 with the LLMs 111*a*-111*e* can reach out to the cybersecurity components, such as the cyber security appliance 100 with the cyber threat detect engine, the cyber threat autonomous response engine 140, the cyberattack simulator 105, the artificial intelligence-based cyber threat analyst module 120, and the cyber-attack restoration engine 190. The orchestrator LLM 111*a* has been trained on the purpose of the services provided by each of the cyber security components 100, 105, 120, 140, and 190 as well as third party cyber security services 181.

The first task dedicated LLM 111*b* is trained on a task of setting up APIs to one or more of the cybersecurity components 100, 105, 120, 140, and 190 as well as to APIs of third party services 181 to obtain a collection of supplementary information. The first task dedicated LLM 111*b* also allows us to query a series of different third-party services 181 that have complex query, language, or simplistic API interactions, or one of those third party services 181 may itself be a large language model assistant itself.

The first task dedicated LLM 111*b* is trained on a huge volume of code. The first task dedicated LLM 111*b* is then provided with one or more API specifications. The first task dedicated LLM 111*b* is large enough to be able to convert a user request "Get the last alert from an iPhone" and convert it into the JavaScript code to open that in the UI. The first task dedicated LLM 111*b* is trained to do tasks on behalf of a user and provide human readable summaries, including launching an investigation using the one or more APIs to find out all of this information.

Again, the first task dedicated LLM 111*b* has been trained on one or more API specifications for one or more of the cyber security components 100, 105, 120, 140, and 190 and/or third party services 181 so that the first task dedicated LLM 111*b* can understand how to make API requests and translate at least one of i) a user question and ii) a question by the LLM itself into API queries into the APIs of one or more cyber security components 100, 105, 120, 140, and 190 of the cyber security system and/or third party services 181. The first task dedicated LLM 111*b* can launch an investigation using the one or more APIs to find out information. The first task dedicated LLM 111*b* can be trained on an API specification for one or more of the cyber security components 100, 105, 120, 140, and 190 and/or third party services 181 so that the first task dedicated LLM 111*b* can understand how to make API requests. The training can include training on capabilities of each of the one or more of the cybersecurity components and/or third party services 181 including what type of information can be found by communicating with each particular component as well as how to get that information through the API request. The first task dedicated LLM 111*b* is trained on an API spec (API schema, API supported format, procedures, etc.) on the details of the API as well as how and why to grab information from specific components. The first task dedicated LLM 111*b* can be trained on the API specification on how to get that information and where to get that information from specific cyber security components 100, 105, 120, 140, and 190 and/or third party services 181. The first task dedicated LLM 111*b* can be trained on talking to the API to these components. The orchestrator LLM 111*a* can be trained as an orchestrator to talk to the LLMs and have the first task dedicated LLM 111*b* talk to the APIs from one or more organizations external to the local cyber security system as well as one or more APIs of the specific cyber security components 100, 105, 120, 140, and 190. Each cyber security component must have its API specification to be known to the first task dedicated LLM 111*b* or at least have its API accessible for a trusted party partner in order to train on that API. The first task dedicated LLM 111*b* is trained on examples of establishing the APIs and then making the query requests. The first task dedicated LLM 111*b* can provide integrations into the user interface of the cyber security components 182, for example, API keys to services provided by each of the cyber security components 100, 105, 120, 140, and 190 or usernames and passwords, or authentication to their firewall, to other virus prevention software, etc.

Previously, these mundane tasks required a human step where some human figures out how, for example, how to perform the authorization policies and access information that is specifically in, for example, Microsoft Defender. Instead, now, the trained first task dedicated LLM 111*b* can figure out how to query that component and take the human out of the loop. The interactive cyber-security user-interface can receive a query request from a human end user, and then the first task dedicated LLM 111*b* translates the end user's query into the language and format that the API of the cyber security component is expecting through its API and makes that query directly into third party environments to supplement any data that any of the LLMs 111*b*-111*e* may have already grabbed in order to flush out the user's request in the first place. The first task dedicated LLM 111*b* can initially train on a predefined list of services that the cybersecurity components integrate with, and then naturally most generic API services can be connected up to. Fine tuning to the training of the first task dedicated LLM 111*b* can occur each time the system wants this first task dedicated LLM 111*b* to query via an API that it has never seen before. Many companies use an open API schema format. However, for API that the first task dedicated LLM 111*b* has never seen before the system can just give the first task dedicated LLM 111*b* the specification for that new API and then perform some training cycles on making API requests to that new API schema.

In an example, the first task dedicated LLM 111*b* has been trained on receiving a query input from an end user in a natural language format and then transform that query input into the language and format needed to interact and query with the API of the particular cyber security component(s) that will have relevant information to assist in answering the query input from the end user. The first task dedicated LLM 111*b* has been trained on to reach out to other large language models, for example, invoke Microsoft Security Copilot and prompt the third party LLM to initiate its own query, if it is, for example, a Microsoft 365 service, or a device that we know to be well, we would go and ask Microsoft Security Copilot "Is this a device that's registered with Entra? If so, give me all of the information on this device." Likewise, the first task dedicated LLM 111*b* can be prompted to query OSINT (Open-Source Intelligence) tools or a customer's threat intelligence tools by connecting to their APIs. This enables, for example, the first task dedicated LLM 111*b* to provide information from a specific cyber security component, such as the artificial intelligence-based cyber threat analyst module, to be checked against a third party service, such as Microsoft Defender or obtaining insights from tools like VirusTotal. The interactive cyber-security user-interface with the LLMs can then be asked things like "Check this information from the artificial intelligence-based cyber threat analyst module against Microsoft Defender?" or "What does VirusTotal think about this endpoint?" The interactive cyber-security user-interface can, when all of this information has already been collected, then present the information as contextual information alongside the query response to the user's query.

Figure 4:
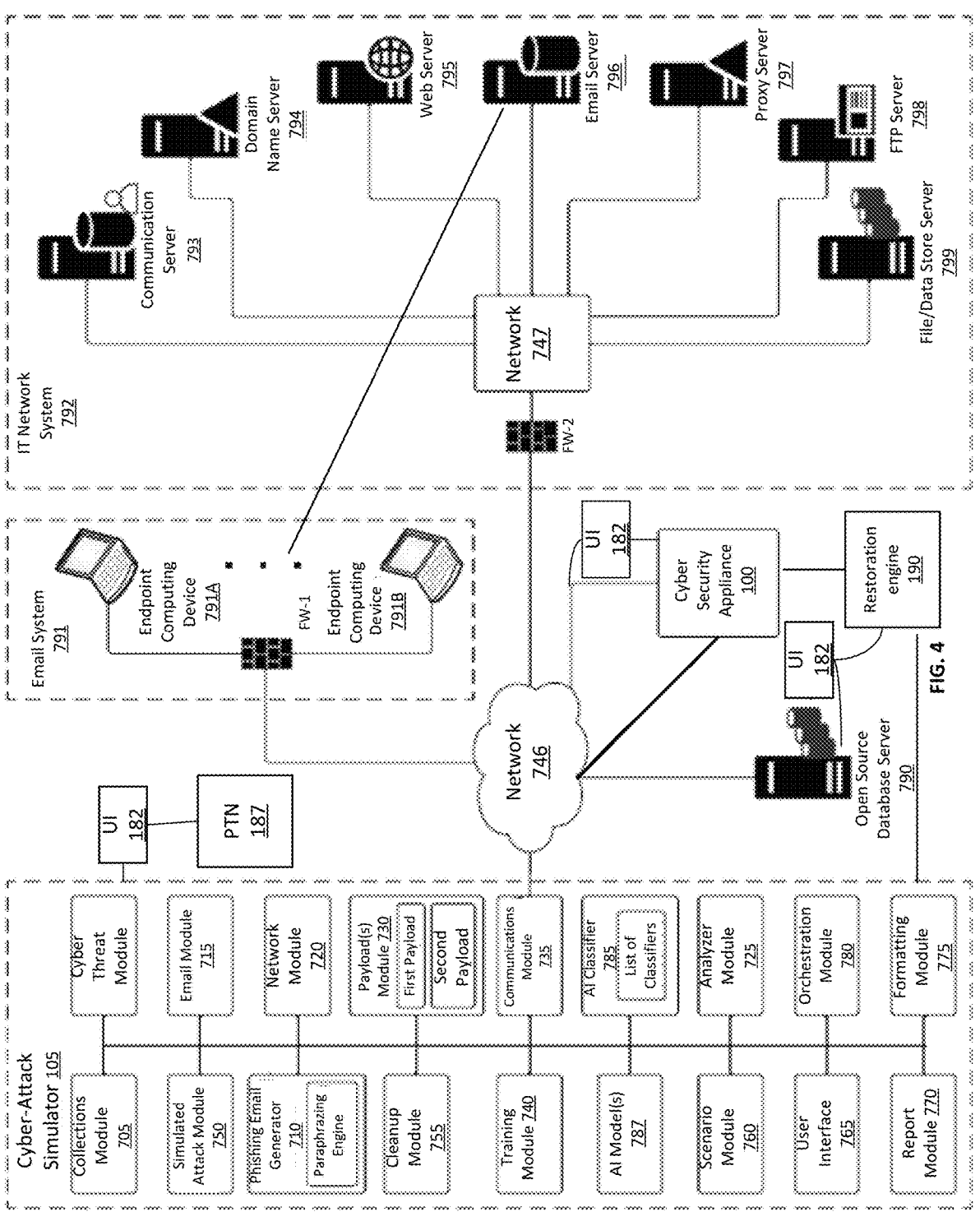
FIG. 4 illustrates a diagram of an embodiment of an interactive cyber-security user-interface for the different cybersecurity components and third party services.

FIG. 4 illustrates a diagram of an embodiment of an interactive cyber-security user-interface for the different cybersecurity components and third party services. The interactive cyber-security user-interface 182 with its set of LLMs can bilaterally communicate with i) the cyber security appliance 100 with the cyber threat detect engine to detect a cyber threat in one or more of an email system 791, an Information Technology network 792, a cloud network, and any combination of these, ii) a proactive threat notification service 187 to publicize new and ongoing cyber threats, iii) a cyber threat autonomous response engine 140 to take one or more actions to mitigate a detected cyber threat, iv) the cyberattack simulator 105 to simulate a cyberattack, and v) the cyber-attack restoration engine 190 to restore network components back to an operational state prior to the cyber-attack.

The second task dedicated LLM 111*c* is trained on a task of formatting a query from the user input into a search syntax utilized by at least one of i) a third-party service 181 and ii) the cybersecurity components 100, 105, 120, 140, 187, 190 so that it can have an advanced search function to go out and find whatever the user is asking for in the user input made in a natural human speech but the second task dedicated LLM 111*c* has translated the query from the user input into the search syntax utilized by the third-party service 181 and/or the cybersecurity components 100, 105, 120, 140, 187, 190. The second task dedicated LLM 111*c* is trained then to bring back that information and present the information back to an end user. Note, the interactive cyber-security user-interface for cybersecurity components 182 allows an end user of any level, whether a cyber security professional or just a regular user to make requests in natural language without needing expertise in the search syntax, or expertise in setting up APIs, etc. The second task dedicated LLM 111*c* is trained on the syntax to search in different third parties and translating a user query from a natural language format of the query into the syntax needed to search in different third parties' systems through their API. The second task dedicated LLM 111*c* is trained on specific query languages that require strict format and syntax for a query.

The second task dedicated LLM 111*c* is trained on the search syntax for different things so that it knows how to understand, using that natural language processing functionality on what the user is asking, and then the search syntax required by the third-party service and/or the cybersecurity component being queried so that the second task dedicated LLM 111*c* knows what to send out in order to grab that information, and then translate that back into a natural human way. The second task dedicated LLM 111*c* is trained on these third-party services 181 and/or the cybersecurity components 100, 105, 120, 140, 187, 190 to understand strictly structured query languages needed at each particular third-party service 181 and/or the cybersecurity component 100, 105, 120, 140, 187, 190.

In an example training process for the second task dedicated LLM 111*c*, the user input is expressed in a natural human speech. The second task dedicated LLM 111*c* is trained to create corresponding pairs between a concept expressed in a formal grammar of a portion of the natural human speech to a meaning and a role level corresponding to that portion of the natural human speech, and then map the meaning and the role level of the portion the natural human speech to a proper search syntax format utilized by at least one of i) a third-party service 181 and ii) the cybersecurity components 100, 105, 120, 140, 187, 190 that corresponds to the proper search syntax format. The second task dedicated LLM 111*c* is trained to translate the portion of the natural human speech now in the proper search syntax format into a query generated by the second task dedicated LLM 111*c* to at least one of i) a third-party service 181 and ii) the cybersecurity components 100, 105, 120, 140, 187, 190 utilize that particular search syntax format. The second task dedicated LLM 111*c* trained on a search syntax enables users to query for detailed cyber security information in a human-friendly manner, simplifying the process of extracting relevant information for investigations. Instead of learning complex search syntax, users can express their queries in natural language, making log analysis more accessible and efficient. The second task dedicated LLM 111*c* understands the intent behind the query and translates it into the appropriate search syntax, simplifying the process of extracting relevant log information for investigations or threat hunting.

Previously, these mundane tasks required a human step where some human figures out how, for example, Microsoft Defender should be queried in KQL format, and how to perform the authorization policies and information that we have specifically to Microsoft Defender. The trained second task dedicated LLM 111*c* can receive a query request from a human end user, and then the trained LLM can figure out how to call out and query Splunk's API in the proper search syntax to obtain the data the end user wants to obtain. The second task dedicated LLM 111*c*, in some standard APIs, can make very simplistic queries. For other APIs and required search syntax, for example, Microsoft Copilot the structured query language needs to be in a syntax called Keyword Query Language (KQL), and similarly, Splunk has a specific query language that the system uses to query that database and data like structures, and AWS has its specific syntax for API queries.

As discussed above, the training of the second task dedicated LLM 111*c* can include using formal grammar, generating like pairs, and having a kind of interpretation layer on the grammar, which is the meaning and the sort of role level, which is the words basically. For the proper syntax, the system can represent the input queries in some kind of fragment grammar and make it stochastic. And then, breaking down the query into fragments creates bits of the grammar. The system can represent how that would be mapped onto a query. The system can generate loads of training data easily. The system can also use other elements to augment the training, for example, changing the syntax and in other ways. It is a way of representing, the meaning and structure simultaneously. The system can define a formal grammar which is basically the types of objects and combination rules that the system can have for those types of objects. There are lots of different formulas that can be used and then how those fragments of grammar connect in order to deduce the meaning of an entire query. The system can also provide the rules and sort of how frequent different options are. For example, a user may merely say, "Find me information on 4, 4, 3 from Splunk." The second LLM with the dialog managers contextual input and because the LLM has been trained on cybersecurity information then the LLM and the structure of the sentence can easily deduce that the user is speaking about IT Port 443. The interpretation of 4, 4, 3 is at Type Port 443. The system builds up this tree structure, where each node of the tree has a kind of syntactic representation, which is the English grammar fragment which would be spoken by the user and a semantic representation, which is the programming language. And then the system can just generate loads and like pairs of English sentences and corresponding programming language, which convey a similar meaning. The trained LLM then correlates the request for information at port 443 from Splunk into the syntax required by Splunk to obtain this information.

The interactive cyber-security user-interface for cybersecurity components 182 with its LLMs provides a natural language interface that will enable every user, regardless of experience level or organization size, to take full advantage of the capabilities of that tool, e.g.—artificial intelligence-based cyber security analyst 120 and/or cyber threat detect engine 100. The interactive cyber-security user-interface for cybersecurity components 182 with its LLMs leverages state-of-the-art natural language processing (NLP) techniques to understand and interpret human language in a cybersecurity context. The interactive cyber-security user-interface for cybersecurity components 182 with its LLMs utilizes machine learning algorithms and neural networks to process and analyze vast amounts of textual data, allowing it to extract meaningful insights and patterns. By comprehending human language, the interactive cyber-security user-interface for cybersecurity components 182 with its LLMs can effectively interact with users, making it accessible to individuals with varying levels of experience and expertise in cybersecurity. The interactive cyber-security user-interface for cybersecurity components 182 with its LLMs helps human cyber security personnel to ask simple, straightforward questions, and then the interactive cyber-security user-interface for cybersecurity components 182 with its LLMs provides real-time insight into an organization's risk profile, including its threat landscape, risk level against critical vulnerabilities, current security posture, compliance requirements, cybersecurity performance metrics and much more.

Figure 5:
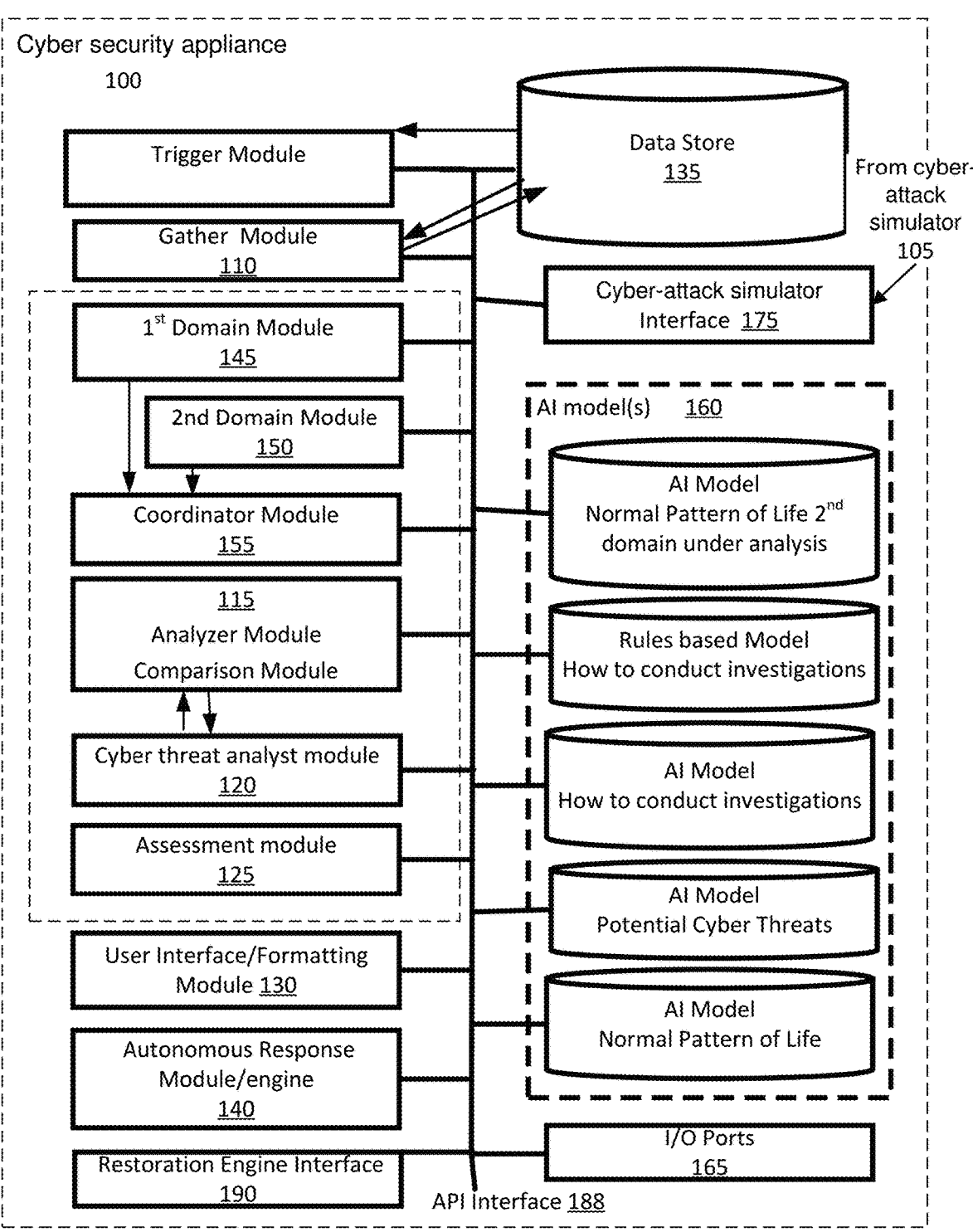
FIG. 5 illustrates a diagram of an embodiment of the interactive cyber-security user-interface for cybersecurity components with the LLMs that interacts with a cyber security appliance with a cyber threat detect engine and its set of AI models.

FIG. 5 illustrates a diagram of an embodiment of the interactive cyber-security user-interface for cybersecurity components with the LLMs that interacts with a cyber security appliance with a cyber threat detect engine and its set of AI models. The cyber threat detect engine 100 and/or the artificial intelligence-based cyber threat analyst module 120 and their corresponding set of AI models 160 can feed the third task dedicated LLM 111d a history of breaches and their severity scores to produce both a summarization of cyber security information including those breaches as well as trends going on as well as to provide recommendations to prioritize those breaches against each other to help the user, such as a human cybersecurity analyst. The interactive cyber-security user-interface for cybersecurity components 182 using the third task dedicated LLM 111d can receive this history of breaches and their severity scores to produce the summary. The third task dedicated LLM 111d is trained on gathering relevant information associated with each model breach to supplement the detection of that model with contextual data for an end user. The third task dedicated LLM 111d is trained to obtain contextual data for each model breach from a wide range of services, which eliminates a human in the process each time to figure out how to interact with those third party services 181 to obtain this contextual data and then produce a summary report with recommendations. The third task dedicated LLM 111d is trained to analyze patterns, identify common vulnerabilities, or attack vectors, and provide actionable insights to improve system security. The third task dedicated LLM 111d is trained to identify the specific device IDs involved as well as the model breaches involved, and then query those devices and/or a storage device with data on those devices' IDs and model breaches to obtain additional contextual data on each specific device as well as the incident(s) being discussed in the summary. The third task dedicated LLM 111d is trained to find some additional information about the incident and model breaches whether the cyber security appliance 100 or other 3rd party service has classified this incident/event as part of an identified cyber threat. With this information, the third task dedicated LLM 111d can generate recommendations, which can include implementing specific security controls, conducting vulnerability assessments, or enhancing user awareness through targeted training. The third task dedicated LLM 111d is trained to perform analysis to empower an organization to proactively strengthen their security defenses. The third task dedicated LLM 111d is trained to provide these recommendations to help the user of the cyber security appliance to improve their system in light of the current model breaches and cyber threat trends.

The interactive cyber-security user-interface for cybersecurity components 182 with the LLMs allows end users to retrieve far more forensic information from internal and third party cyber security components 181 such as their own about search or their data lakes, or any other database tool that they have. The LLMs retrieve that information automatically without the human having to do that query themselves, or script out a hard-coded series of operations for each different possible query. The interactive cyber-security user-interface for cybersecurity components 182 cooperating with each of the task dedicated LLMs 111b-111e allows the system to provide the supplementary information without a human needing to trigger to go out and seek this information, which also allows us to support a much wider range of inputs.

Artificial Intelligence Training

Detailed discussion on the machine learning and training has occurred in different portions of this document and won't be replicated here. Again, In general, a LLM can be a very large deep learning model that is pre-trained on vast amounts of data. The underlying transformer can be a set of neural networks that consist of an encoder and a decoder with self-attention capabilities. The encoder and decoder extract meanings from a sequence of text and understand the relationships between words and phrases in it. A transformer in the LLM can be capable of unsupervised training, although a more precise explanation is that the transformer performs self-learning. It can be through this process that the transformer learns to understand basic grammar, languages, and knowledge.

The large language models can be trained to understand and generate human-like language and the associated generative AI-creating algorithms that can generate new content based on patterns learned from existing data, which is then used to enhance cyber security measures. The large language models can have AI algorithms that have been trained on a large amount of text-based data, typically scraped from i) the open internet such as webpages and sources such as scientific research, books, forums or social media posts, ii) security data from a fleetwide deployment of cyber security appliances 100, as well as iii) combinations of both. The generative portion of the LLM can generate new content (e.g., software code, text, requests, etc.). The cyber security system uses large language models (and the associated generative AI-creating algorithms that can generate new content based on patterns learned from existing data.

The LLM model can be trained from scratch and/or merely be fine-tuned/refined. The fine-tuning of the training can start with a generic LLM model that has already been trained and specialized in some of these elements and then have certain layers and parameters unlocked. Fine tuning trains alters the unlocked layers and parameters from their existing training to perform the functions described herein. For example, one can acquire a single LLM model that is capable of understanding natural language and then train that LLM on the functionality discussed herein, or one could have multiple individual LLM models that are fine-tuned on each of the tasks discussed herein. In addition, the multiple individual LLM models can be fine-tuned on its own specific aspect of i) the collection of supplementary information, ii) the summarization of cyber security information, or iii) the suggested response to the cyber security issue, etc.

The LLM training process can include the following. The use of unlabeled data can be used to train. However, most of the information is either in standard API schema or somewhat standardized cyber security information format so the data can be somewhat considered already semi labeled data. Most training algorithms utilized to train can work. Tens of thousands of cycles of the training occurred for each task that the LLM is being requested to learn. Training data across a fleet of cyber security deployments can be used as well as generic training data scaped from the Internet can be used so that the machine learning does not become too specialized. A training process utilized was a problem to be solved/learned and key efficiencies and/or goals were used as measures during the machine learning process. Again, a generically trained LLM could be the starting point and then certain layers and parameters are unlocked for fine tune training to particularly adapt the AI leaning as discussed herein. The LLM has been trained on tens of thousands of cyber security incident reports.

Additional Details

The following text below discusses how some of the other components in the cyber security system operate; and thus, how these components respond to the commands, requests, and communications from the LLMs 188.

FIG. 5 shows the AI-based cyber security appliance with example components making up a detection engine that protects a system, including but not limited to a network/domain, from cyber threats. Various Artificial Intelligence models and modules of the cyber security appliance 100 cooperate to protect a system, such as one or more networks/domains under analysis, from cyber threats. As shown, according to one embodiment of the disclosure, the AI-based cyber security appliance 100 may include a trigger module, a gather module 110, an analyzer module 115, a cyber threat analyst module 120, an assessment module 125, a user interface and formatting module 130, a data store 135, an autonomous response engine 140 and/or an interface to an autonomous response engine 140, an Information Technology network domain module 145, an email domain module 150, and a coordinator module 155, one or more AI models 160 (hereinafter, AI model(s)"), and/or other modules. The AI model(s) 160 may be trained with machine learning on a normal pattern of life for entities in the network(s)/domain (s) under analysis, with machine learning on cyber threat hypotheses to form and investigate a cyber threat hypothesis on what are a possible set of cyber threats and their characteristics, symptoms, remediations, etc., and/or trained on possible cyber threats including their characteristics and symptoms, an interface to a restoration engine 190, an interface to a cyber-attack simulator 105, an API interface to the LLMs 188, and other similar components.

The cyber security appliance 100 can host the cyber threat detection engine and other components. The cyber security appliance 100 includes a set of modules cooperating with one or more Artificial Intelligence models configured to perform a machine-learned task of detecting a cyber threat incident. The detection engine uses the set of modules cooperating with the one or more Artificial Intelligence models to detect anomalous behavior of one or more nodes, including at least user accounts, devices, and versions of source code files, in a graph of a system being protected. The detection engine uses the set of modules cooperating with the one or more Artificial Intelligence models in the cyber security appliance 100 to prevent a cyber threat from compromising the nodes and/or spreading through the nodes of the system.

The cyber security appliance 100 with the Artificial Intelligence (AI)-based cyber security system may protect a network/domain from a cyber threat (insider attack, malicious files, malicious emails, etc.). In an embodiment, the cyber security appliance 100 can protect all of the devices on the network(s)/domain(s) being monitored by monitoring domain activity including communications). For example, the IT network domain module (e.g., first domain module 145) may communicate with network sensors to monitor network traffic going to and from the computing devices on the network as well as receive secure communications from software agents embedded in host computing devices/containers. Other domain modules such as the email domain module 150 and a cloud domain module operate similarly with their domain. The steps below will detail the activities and functions of several of the components in the cyber security appliance 100.

The gather module 110 may be configured with one or more process identifier classifiers. Each process identifier classifier may be configured to identify and track one or more processes and/or devices in the network, under analysis, making communication connections. The data store 135 cooperates with the process identifier classifier to collect and maintain historical data of processes and their connections, which is updated over time as the network is in operation. Individual processes may be present in merely one or more domains being monitored. In an example, the process identifier classifier can identify each process running on a given device along with its endpoint connections, which are stored in the data store 135. In addition, a feature classifier can examine and determine features in the data being analyzed into different categories.

The analyzer module 115 can cooperate with the AI model(s) 160 or other modules in the cyber security appliance 100 to confirm a presence of a cyberattack against one or more domains in an enterprise's system (e.g., see system/enterprise network 791, 792, and 747 of FIG. 4). A process identifier in the analyzer module 115 can cooperate with the gather module 110 to collect any additional data and metrics to support a possible cyber threat hypothesis. Similarly, the cyber threat analyst module 120 can cooperate with internal data sources as well as external data sources to collect data in its investigation. More specifically, the cyber threat analyst module 120 can cooperate with the other modules and the AI model(s) 160 in the cyber security appliance 100 to conduct a long-term investigation and/or a more in-depth investigation of potential and emerging cyber threats directed to one or more domains in an enterprise's system. Herein, the cyber threat analyst module 120 and/or the analyzer module 115 can also monitor for other anomalies, such as model breaches, including, for example, deviations for a normal behavior of an entity, and other techniques discussed herein. As an illustrative example, the analyzer module 115 and/or the cyber threat analyst module 120 can cooperate with the AI model(s) 160 trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

According to one embodiment of the disclosure, the cyber threat analyst module 120 allows two levels of investigations of a cyber threat that may suggest a potential impending cyberattack. In a first level of investigation, the analyzer module 115 and AI model(s) 160 can rapidly detect and then the autonomous response engine 140 will autonomously respond to overt and obvious cyberattacks. However, thousands to millions of low level anomalies occur in a domain under analysis all of the time; and thus, most other systems need to set the threshold of trying to detect a cyberattack by a cyber threat at level higher than the low level anomalies examined by the cyber threat analyst module 120 just to not have too many false positive indications of a cyberattack when one is not actually occurring, as well as to not overwhelm a human cyber security analyst receiving the alerts with so many notifications of low level anomalies that they just start tuning out those alerts. However, advanced persistent threats attempt to avoid detection by making these low-level anomalies in the system over time during their cyberattack before making their final coup de grace/ultimate mortal blow against the system (e.g., domain) being protected. The cyber threat analyst module 120 also conducts a second level of investigation over time with the assistance of the AI model(s) 160 trained with machine learning on how to form cyber threat hypotheses and how to conduct investigations for a cyber threat hypothesis that can detect these advanced persistent cyber threats actively trying to avoid detection by looking at one or more of these low-level anomalies as a part of a chain of linked information.

Figure 7:
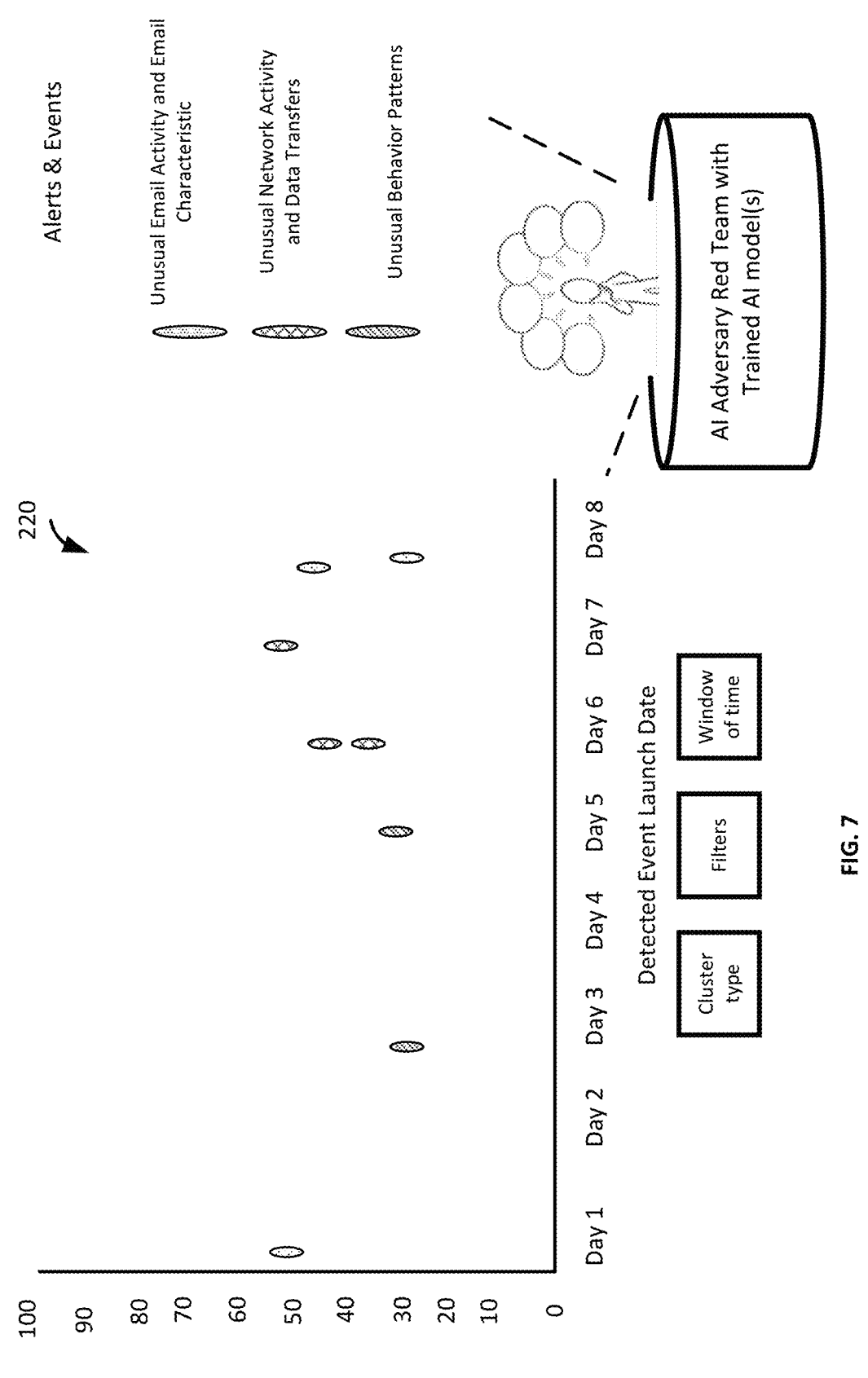
FIG. 7 illustrates a graph 220 of an embodiment of an example chain of unusual behaviour for, in this example, the email activities and IT network activities deviating from a normal pattern of life in connection with the rest of the system/network under analysis.

Note, a data analysis process can be algorithms/scripts written by humans to perform their function discussed herein; and can in various cases use AI classifiers as part of their operation. The cyber threat analyst module 120 forms in conjunction with the AI model(s) 160 trained with machine learning on how to form cyber threat hypotheses and how to conduct investigations for a cyber threat hypothesis investigate hypotheses on what are a possible set of cyber threats. The cyber threat analyst module 120 can also cooperate with the analyzer module 115 with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the AI model(s) 160 trained with machine learning on the normal pattern of life of entities in the system. For example, as shown in FIG. 7, the cyber threat analyst module 120 may perform several additional rounds 220 of gathering additional information, including abnormal behavior, over a period of time, in this example, examining data over a 7-day period to determine causal links between the information. The cyber threat analyst module 120 may submit to check and recheck various combinations/a chain of potentially related information, including abnormal behavior of a device/user account under analysis for example, until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted. For this embodiment, a human cyber security analyst is needed to further investigate the anomaly (and/or anomalies) of interest included in the chain of potentially related information.

Furthermore, the artificial intelligence-based cyber threat analyst module 120 aids security analysts in making informed decisions for cyber threat hunting. The artificial intelligence-based cyber threat analyst module 120 equips human security analysts with the necessary information to proactively identify and mitigate potential security incidents. By analyzing data from various sources, such as network logs, intrusion detection systems, and threat intelligence feeds, the tool can highlight indicators of compromise (IOCs) and provide recommendations for remediation actions. This empowers security analysts to respond swiftly to critical incidents and minimize the impact on the organization.

To streamline security operations, the artificial intelligence-based cyber threat analyst module 120 automates repetitive and mundane tasks, enabling analysts to focus on more critical and complex activities. The artificial intelligence-based cyber security analyst can handle data collection and extraction from multiple sources, reducing the manual effort required to gather relevant information for analysis. Additionally, the tool performs basic threat searches and detection, leveraging its understanding of threat intelligence and historical attack patterns to identify potential security threats.

The artificial intelligence-based cyber threat analyst module 120 as a large language model (LLM) is built to incorporate cyber threat knowledge from external data stores, external data sources, as well as from a network's own cyber security appliance. The artificial intelligence-based cyber threat analyst module 120 uses threat intelligence to understand a cyber threat adversary tactics and motivations. The effectiveness of the artificial intelligence-based cyber threat analyst module 120 lies in its ability to access and integrate diverse data sources. The artificial intelligence-based cyber security analyst can tap into external data stores, such as threat intelligence platforms and vulnerability databases, to enrich its understanding of the threat landscape. Additionally, the tool leverages data from an organization's internal cybersecurity appliance, an intrusion prevention simulator system, and endpoint protection solutions, to gain insights into the specific threats and vulnerabilities faced by the organization. This combination of external and internal data sources allows the artificial intelligence-based cyber threat analyst module 120 to provide a holistic view of the organization's security posture.

Through continuous improvement and refinement, the artificial intelligence-based cyber threat analyst module 120 ensures that it remains up-to-date with the evolving cybersecurity landscape. It collaborates closely with industry-leading cyber threat hunters, managed detection and response operators, and incident response experts to incorporate their expertise and insights into its analysis. This feedback loop helps enhance the tool's accuracy and effectiveness, enabling it to adapt to emerging threats and new attack vectors.

In addition to its technical capabilities, the artificial intelligence-based cyber threat analyst module 120 facilitates human-machine collaboration to tackle the challenges posed by adversaries. By leveraging the speed and computational power of AI, combined with human expertise and intuition, security teams can gain a significant advantage. The tool serves as a force multiplier, augmenting the capabilities of security analysts and enabling them to detect and respond to threats more efficiently.

The artificial intelligence-based cyber threat analyst module 120 understands the importance of adaptability and agility in the face of evolving threats. The artificial intelligence-based cyber threat analyst module 120 employs advanced analytics to prioritize critical vulnerabilities and potential risks, enabling organizations to allocate their resources effectively. By generating and validating new indicators of attack (IOAs), the tool aids in the identification of emerging attack patterns, empowering security teams to proactively defend against evolving threats.

Ultimately, the artificial intelligence-based cyber threat analyst module 120 recognizes that effective cybersecurity requires a combination of AI-driven analysis and human intelligence. The artificial intelligence-based cyber threat analyst module 120 can incorporate human insight into the investigative loop. The artificial intelligence-based cyber threat analyst module 120 tracks the adversaries that are constantly innovating and adapting their tactics, and incorporates human expertise and insights into the training data used by the models in the artificial intelligence-based cyber threat analyst module 120. By blending the strengths of AI and human intelligence, organizations can stay ahead of the threat landscape and proactively defend against emerging cyber threats. The adversary is constantly breaking rules and changing tactics, making it hard for AI to respond without the right data to train the model. This is why human-validated content is critical for AI to perform security use cases and give security teams the advantage over adversaries.

Returning back to FIG. 5, an input from the cyber threat analyst module 120 of a supported hypothesis of a potential cyber threat will trigger the analyzer module 115 to compare, confirm, and send a signal to act upon and mitigate that cyber threat. In contrast, the cyber threat analyst module 120 investigates subtle indicators and/or initially seemingly isolated unusual or suspicious activity such as a worker is logging in after their normal working hours or a simple system misconfiguration has occurred. Most of the investigations conducted by the cyber threat analyst module 120 cooperating with the AI model(s) 160 trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically, during the investigations, several rounds of data gathering to support or refute the long list of potential cyber threat hypotheses formed by the cyber threat analyst module 120 will occur before the algorithms in the cyber threat analyst module 120 will determine whether a particular cyber threat hypothesis is supported, refuted, or needs further investigation by a human. The rounds of data gathering may build chains of linked low-level indicators of unusual activity along with potential activities that could be within a normal pattern of life for that entity to evaluate the whole chain of activities to support or refute each potential cyber threat hypothesis formed. (See again, for example, FIG. 7 and a chain of linked low-level indicators, including abnormal behavior compared to the normal pattern of life for that entity, all under a score of 50 on a threat indicator score). The investigations by the cyber threat analyst module 120 can happen over a relatively long period of time and be far more in depth than the analyzer module 115 which will work with the other modules and AI model(s) 160 to confirm that a cyber threat has in fact been detected.

The gather module 110 may further extract data from the data store 135 at the request of the cyber threat analyst module 120 and/or analyzer module 115 on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The gather module 110 cooperates with the cyber threat analyst module 120 and/or analyzer module 115 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module 120 is configured to cooperate with the AI model(s) 160 trained with machine learning on how to form cyber threat hypotheses and how to conduct investigations for a cyber threat hypothesis to form and investigate hypotheses on what are a possible set of cyber threats and then can cooperate with the analyzer module 115 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 160 trained with machine learning on the normal pattern of life/normal behavior of entities in the domains under analysis.

Note, in the first level of threat detection, the gather module 110 and the analyzer module 115 cooperate to supply any data and/or metrics requested by the analyzer module 115 cooperating with the AI model(s) 160 trained on possible cyber threats to support or rebut each possible type of cyber threat. Again, the analyzer module 115 can cooperate with the AI model(s) 160 and/or other modules to rapidly detect and then cooperate with the autonomous response engine 140 to autonomously respond to overt and obvious cyberattacks, (including ones found to be supported by the cyber threat analyst module 120).

As a starting point, the AI-based cyber security appliance 100 can use multiple modules, each capable of identifying abnormal behavior and/or suspicious activity against the AI model(s) 160 trained on a normal pattern of life for the entities in the network/domain under analysis, which is supplied to the analyzer module 115 and/or the cyber threat analyst module 120. The analyzer module 115 and/or the cyber threat analyst module 120 may also receive other inputs such as AI model breaches, AI classifier breaches, etc. a trigger to start an investigation from an external source.

Many other model breaches of the AI model(s) 160 trained with machine learning on the normal behavior of the system can send an input into the cyber threat analyst module 120 and/or the trigger module to trigger an investigation to start the formation of one or more hypotheses on what are a possible set of cyber threats that could include the initially identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v), etc.

Note, the cyber threat analyst module 120 cooperating with the AI model(s) 160 trained with machine learning on how to form cyber threat hypotheses and how to conduct investigations for a cyber threat hypothesis in the AI-based cyber security appliance 100 provides an advantage as it reduces the time taken for human led or cyber security investigations, provides an alternative to manpower for small organizations and improves detection (and remediation) capabilities within the cyber security appliance 100.

The cyber threat analyst module 120, which forms and investigates hypotheses on what are the possible set of cyber threats, can use hypotheses mechanisms including any of 1) one or more of the AI model(s) 160 trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI model(s) 160 trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module 120 and/or the analyzer module 115 can feed the cyber threat details to the assessment module 125 to generate a threat risk score that indicate a level of severity of the cyber threat.

The multiple Artificial Intelligence-based engines each have an interface to communicate with the other separate Artificial Intelligence-based engines. Each Intelligence-based engine has an interface to communicate with another separate Artificial Intelligence-based engine, which is configured to understand a type of information and communication that this other separate Artificial Intelligence-based engine needs to make determinations on an ongoing cyber-attack from that other Artificial Intelligence-based engine's perspective. The autonomous response engine 140 works with the assessment module in the detection engine when the cyber threat is detected and autonomously takes one or more actions to mitigate the cyber threat. FIG. 5 shows the example components making up the detection engine to include interfaces to the cyber-attack simulator, the autonomous response engine 140, and the restoration engine 190.

The cyber threat detection engine can also have an anomaly alert system in a formatting module configured to report out anomalous incidents and events as well as the cyber threat detected to a display screen viewable by a human cyber-security professional. Each Artificial Intelligence-based engine has a rapid messaging system to communicate with a human cyber-security team to keep the human cyber-security team informed on actions autonomously taken and actions needing human approval to be taken.

Referring to FIG. 1, the cyber security restoration engine 190 is configured to take one or more remediation actions based on configured and/or Artificial Intelligence assistance to remediate the one or more nodes in the graph of the system being protected back to a trusted operational state in a recovery from the cyber threat. These actions might be fully automatic, or require a specific human confirmation decision before they begin. The cyber security restoration engine 190 is configured to cooperate with the other AI-based engines of the cyber security system, via the interfaces and/or direct integrations, to track and understand the cyber threat identified by the other components as well as track the one or more mitigation actions taken to mitigate the cyber threat during the cyberattack by the other components in order to assist in intelligently restoring the protected system while still mitigating the cyber threat attack back to a trusted operational state; and thus, as a situation develops with an ongoing cyberattack, the cyber security restoration engine 190 is configured to take one or more remediation actions to remediate (e.g. restore) at least one of the nodes in the graph of the protected system back to a trusted operational state while the cyberattack is still ongoing.

The example multiple Artificial Intelligence-based engines cooperating with each other can include i) the cyber threat detection engine, ii) an autonomous response engine 140, iii) a cyber-security restoration engine 190, and iv) a cyber-attack simulator. i) The cyber threat detection engine (consisting of the modules making up the cyber security appliance 100) can be configured to use Artificial Intelligence algorithms trained to perform a machine-learned task of detecting the cyber threat. (See for example FIG. 5) ii) The autonomous response engine 140 can be configured to use Artificial Intelligence algorithms trained to perform a machine-learned task of taking one or more mitigation actions to mitigate the cyber threat. iii) The cyber-security restoration engine 190 can be configured to use Artificial Intelligence algorithms trained to perform a machine-learned task of remediating the system being protected back to a trusted operational state. iv) The cyber-attack simulator can be configured to use Artificial Intelligence algorithms trained to perform a machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack. (See, for example, FIG. 4)

The multiple Artificial Intelligence-based engines have communication hooks in between them to exchange a significant amount of behavioral metrics including data between the multiple Artificial Intelligence-based engines to work in together to provide an overall cyber threat response.

The intelligent orchestration component can be configured as a discreet intelligent orchestration component that exists on top of the multiple Artificial Intelligence-based engines to orchestrate the overall cyber threat response and an interaction between the multiple Artificial Intelligence-based engines, each configured to perform its own machine-learned task. Alternatively, the intelligent orchestration component can be configured as a distributed collaboration with a portion of the intelligent orchestration component implemented in each of the multiple Artificial Intelligence-based engines to orchestrate the overall cyber threat response and an interaction between the multiple Artificial Intelligence-based engines. In an embodiment, whether implemented as a distributed portion on each AI engine or a discrete AI engine itself, the intelligent orchestration component can use self-learning algorithms to learn how to best assist the orchestration of the interaction between itself and the other AI engines, which also implement self-learning algorithms themselves to perform their individual machine-learned tasks better.

The multiple Artificial Intelligence-based engines can be configured to cooperate to combine an understanding of normal operations of the nodes, an understanding emerging cyber threats, an ability to contain those emerging cyber threats, and a restoration of the nodes of the system to heal the system with an adaptive feedback between the multiple Artificial Intelligence-based engines in light of simulations of the cyberattack to predict what might occur in the nodes in the system based on the progression of the attack so far, mitigation actions taken to contain those emerging cyber threats and remediation actions taken to heal the nodes using the simulated cyberattack information.

One or more Artificial Intelligence models in the detection engine can be configured to maintain what is considered to be normal behavior for that node, which is constructed on a per node basis, on the system being protected from historical data of that specific node over an operation of the system being protected.

The multiple Artificial Intelligence-based engines each have an interface to communicate with the other separate Artificial Intelligence-based engines configured to understand a type of information and communication that the other separate Artificial Intelligence-based engine needs to make determinations on an ongoing cyberattack from that other Artificial Intelligence-based engine's perspective. Each Artificial Intelligence-based engine has an instant messaging system to communicate with a human cyber-security team to keep the human cyber-security team informed on actions autonomously taken and actions needing human approval as well as generate reports for the human cyber-security team.

FIG. 1 illustrates a diagram of an embodiment of i) the cyber threat detection engine using Artificial Intelligence algorithms trained to perform a first machine-learned task of detecting the cyber threat, ii) an autonomous response engine 140 using Artificial Intelligence algorithms trained to perform a second machine-learned task of taking one or more mitigation actions to mitigate the cyber threat, iii) a cyber-security restoration engine 190 using Artificial Intelligence algorithms trained to perform a third machine-learned task of remediating the system being protected back to a trusted operational state, and iv) a cyber-attack simulator using Artificial Intelligence algorithms trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack, in order for these four Artificial Intelligence-based engines to work together. In addition, the intelligent orchestration component can use Artificial Intelligence algorithms trained to perform a fifth machine-learned task of adaptive interactive response between the multiple Artificial Intelligence-based engines to provide information each Artificial Intelligence engine needs to work cohesively to provide an overall incidence response that mitigates different types of cyber threats while still minimizing an impact tailored to this particular system being protected. For example, when a conversation occurs between the AI-based engines such as a system that can be positively affected by both proposed mitigation actions and proposed restoration actions, any of which might be attempted but fail or only partially succeed, then the intelligent orchestration component can arbitrate and evolve the best result for this particular system being protected. The intelligent orchestration component can help anticipate i) the needs of and ii) cohesive response of each Artificial Intelligence-based engine based on a current detected cyber threat.

The cyber-security restoration engine 190 receives and sends inputs through communication hooks (e.g.) interfaces to all of these Artificial Intelligence-based engines each configured with self-learning AI machine learning algorithms to, respectively, i) to detect the cyber threat, ii) to respond to mitigate that cyber threat, and iii) to predict how that cyber threat might occur and likely progress through simulations. Each of these Artificial Intelligence-based engines has bi-directional communications, including the exchange of raw data, with each other as well as with software agents resident in physical and/or virtual devices making up the system being protected as well as bi-directional communications with sensors within the system being protected. Note, the system under protection can be, for example, an IT network, an OT network, a Cloud network, an email network, a source code database, an endpoint device, etc.

In an example, the autonomous response engine 140 uses its intelligence to cooperate with a cyber-attack simulator and its Artificial Intelligence-based simulations to choose and initiate an initial set of one or more mitigation actions indicated as a preferred targeted initial response to the detected cyber threat by autonomously initiating those mitigation actions to defend against the detected cyber threat, rather than a human taking an action. The autonomous response engine 140, rather than the human taking the action, is configured to autonomously cause the one or more mitigation actions to be taken to contain the cyber threat when a threat risk parameter from an assessment module in the detection engine is equal to or above an actionable threshold. Example mitigation actions can include 1) the autonomous response engine 140 monitoring and sending signals to a potentially compromised node to restrict communications of the potentially compromised node to merely normal recipients and types of communications according to the Artificial Intelligence model trained to model the normal pattern of life for each node in the protected system, 2) the autonomous response engine 140 trained on how to isolate a compromised node as well as to take mitigation acts with other nodes that have a direct nexus to the compromised node.

In another example, the cyber-attack simulator and its Artificial Intelligence-based simulations use intelligence to cooperate with the cyber-security restoration engine 190 to assist in choosing one or more remediation actions to perform on nodes affected by the cyberattack back to a trusted operational state while still mitigating the cyber threat during an ongoing cyberattack based on effects determined through the simulation of possible remediation actions to perform and their effects on the nodes making up the system being protected and preempt possible escalations of the cyberattack while restoring one or more nodes back to a trusted operational state.

In another example, the cyber security restoration engine 190 restores the one or more nodes in the protected system by cooperating with at least two or more of 1) an Artificial Intelligence model trained to model a normal pattern of life for each node in the protected system, 2) an Artificial Intelligence model trained on what are a possible set of cyber threats and their characteristics and symptoms to identify the cyber threat (e.g. malicious actor/device/file) that is causing a particular node to behave abnormally (e.g. malicious behavior) and fall outside of that node's normal pattern of life, and 3) the autonomous response engine 140.

FIG. 4 shows an embodiment of the cyber-attack simulator with Artificial Intelligence-based simulations conducted in the cyber-attack simulator by constructing a graph of nodes of the system being protected (e.g. a network including i) the physical devices connecting to the network, any virtualized instances of the network, user accounts in the network, email accounts in the network, etc. as well as ii) connections and pathways through the network) to create a virtualized instance of the network to be tested. As shown in FIG. 4, the various cooperating modules residing in the cyber-attack simulator 105 may include, but are not limited to, a collections module 705, a cyberattack generator (e.g. phishing email generator with a paraphrasing engine) 702, an email module 715, a network module 720, an analyzer module 725, a payloads module 730 with first and second payloads, a communication module 735, a training module 740, a simulated attack module 750, a cleanup module 755, a scenario module 760, a user interface 765, a reporting module, a formatting module, an orchestration module, an AI classifier with a list of specified classifiers.

The cyber-attack simulator 105 may be implemented via i) a simulator to model the system being protected and/or ii) a clone creator to spin up a virtual network and create a virtual clone of the system being protected configured to pentest one or more defenses provided by scores based on both the level of confidence that the cyber threat is a viable threat and the severity of the cyber threat (e.g., attack type where ransomware attacks has greater severity than phishing attack; degree of infection; computing devices likely to be targeted, etc.). The threat risk scores be used to rank alerts that may be directed to enterprise or computing device administrators. This risk assessment and ranking is conducted to avoid frequent "false positive" alerts that diminish the degree of reliance/confidence on the cyber security appliance 100. The cyber-attack simulator 105 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data. The cyber-attack simulator 105 may use the trained AI models to cooperate with one or more AI classifier(s) by producing a list of specific organization-based classifiers for the AI classifier. The cyber-attack simulator 105 is further configured to calculate,—based at least in part on the results of the one or more hypothetical simulations of a possible cyberattack and/or of an actual ongoing cyberattack from a cyber threat determine a risk score for each node (e.g. each device, user account, etc.), the threat risk score being indicative of a possible severity of the compromise prior to an autonomous response action is taken in response to the actual cyberattack of the cyber incident.

FIG. 8 illustrates a diagram of an embodiment of the cyber-attack simulator and its Artificial Intelligence-based simulations constructing an example graph of nodes in an example network and simulating how the cyberattack might likely progress in the future tailored with an innate understanding of a normal behavior of the nodes in the system being protected and a current operational state of each node in the graph of the protected system during simulations of cyberattacks. The cyber-attack simulator 105 plots the attack path through the nodes and estimated times to reach critical nodes in the network. The cyberattack simulation modeling is run to identify the routes, difficulty, and time periods from certain entry notes to certain key servers.

Again, similarly named components in each Artificial Intelligence-based engine can 1) perform similar functions and/or 2) have a communication link from that component located in one of the Artificial Intelligence-based engines and then information is needed from that component is communicated to another Artificial Intelligence-based engine that through the interface to that Artificial Intelligence-based engine.

Training of AI Pre-Deployment and then During Deployment

In step 1, an initial training of the Artificial Intelligence model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model, such as AI model(s) 160 or example (hereinafter "AI model(s) 160"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. In this example, one of the AI models 160 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 100, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 160 may be trained on a normal pattern of life of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

Thus, a deployed Artificial Intelligence model 160 trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g., user account, device, etc.). Initial training of one or more Artificial Intelligence models 160 trained with machine learning on a normal behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of one or more Artificial Intelligence models trained on a normal pattern of life of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model such as various Bayesian techniques, clustering, etc. The AI models 160 can be implemented with various mechanisms such neural networks, decision trees, etc. and combinations of these. Likewise, one or more supervised machine learning AI models 160 may be trained to create possible hypotheses and perform cyber threat investigations on agnostic examples of past historical incidents of detecting a multitude of possible types of cyber threat hypotheses previously analyzed by human cyber security analyst. More on the training of AI models 160 are trained to create one or more possible hypotheses and perform cyber threat investigations will be discussed later.

At its core, the self-learning AI models 160 that model the normal behavior (e.g. a normal pattern of life) of entities in the network mathematically characterizes what constitutes 'normal' behavior, based on the analysis of a large number of different measures of a device's network behavior-packet traffic and network activity/processes including server access, data volumes, timings of events, credential use, connection type, volume, and directionality of, for example, uploads/downloads into the network, file type, packet intention, admin activity, resource and information requests, command sent, etc.

Clustering Methods

In order to model what should be considered as normal for a device or cloud container, its behavior can be analyzed in the context of other similar entities on the network. The AI models (e.g., AI model(s) 160) can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber threat analysis. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. More on the training of the AI models that are trained to create one or more possible hypotheses and perform cyber threat investigations will be discussed later.

Next, the various Artificial Intelligence models and AI classifiers combine use of unsupervised and supervised machine learning to learn 'on the job'—it does not depend upon solely knowledge of previous cyber threat attacks. The Artificial Intelligence models and classifiers combine use of unsupervised and supervised machine learning constantly revises assumptions about behavior, using probabilistic mathematics, that is always up to date on what a current normal behavior is, and not solely reliant on human input. The Artificial Intelligence models and classifiers combine use of unsupervised and supervised machine learning on cyber security is capable of seeing hitherto undiscovered cyber events, from a variety of threat sources, which would otherwise have gone unnoticed.

Next, these cyber threats can include, for example: Insider threat-malicious or accidental, Zero-day attacks-previously unseen, novel exploits, latent vulnerabilities, machine-speed attacks-ransomware and other automated attacks that propagate and/or mutate very quickly, Cloud and SaaS-based attacks, other silent and stealthy attacks advance persistent threats, advanced spear-phishing, etc.

Ranking the Cyber Threat

The assessment module 125 and/or cyber threat analyst module 120 of FIG. 5 can cooperate with the AI model(s) 160 trained on possible cyber threats to use AI algorithms to account for ambiguities by distinguishing between the subtly differing levels of evidence that characterize network data. Instead of generating the simple binary outputs 'malicious' or 'benign', the AI's mathematical algorithms produce outputs marked with differing degrees of potential threat. This enables users of the system to rank alerts and notifications to the enterprise security administrator in a rigorous manner, and prioritize those which most urgently require action. Meanwhile, it also assists to avoid the problem of numerous false positives associated with simply a rule-based approach.

More on the Operation of the Cyber Security Appliance 100

As discussed in more detail below, the analyzer module 115 and/or cyber threat analyst module 120 can cooperate with the one or more unsupervised AI (machine learning) model 160 trained on the normal pattern of life/normal behavior in order to perform anomaly detection against the actual normal pattern of life for that system to determine whether an anomaly (e.g., the identified abnormal behavior and/or suspicious activity) is malicious or benign. In the operation of the cyber security appliance 100, the emerging cyber threat can be previously unknown, but the emerging threat landscape data 170 representative of the emerging cyber threat shares enough (or does not share enough) in common with the traits from the AI models 160 trained on cyber threats to now be identified as malicious or benign. Note, if later confirmed as malicious, then the AI models 160 trained with machine learning on possible cyber threats can update their training. Likewise, as the cyber security appliance 100 continues to operate, then the one or more AI models trained on a normal pattern of life for each of the entities in the system can be updated and trained with unsupervised machine learning algorithms. The analyzer module 115 can use any number of data analysis processes (discussed more in detail below and including the agent analyzer data analysis process here) to help obtain system data points so that this data can be fed and compared to the one or more AI models trained on a normal pattern of life, as well as the one or more machine learning models trained on potential cyber threats, as well as create and store data points with the connection fingerprints.

All of the above AI models 160 can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

Anomaly Detection/Deviations

Anomaly detection can discover unusual data points in your dataset. Anomaly can be a synonym for the word 'outlier'. Anomaly detection (or outlier detection) is the identification of rare items, events or observations which raise suspicions by differing significantly from the majority of the data. Anomalous activities can be linked to some kind of problems or rare events. Since there are tons of ways to induce a particular cyber-attack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day to day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle.

The goal of the anomaly detection algorithm through the data fed to it is to learn the patterns of a normal activity so that when an anomalous activity occurs, the modules can flag the anomalies through the inclusion-exclusion principle. The cyber threat module can perform its two level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given feature's values are non-anomalous, otherwise it's anomalous. Note, this anomaly detection can determine that a data point is anomalous/non-anomalous on the basis of a particular feature. In reality, the cyber security appliance 100 should not flag a data point as an anomaly based on a single feature. Merely, when a combination of all the probability values for all features for a given data point is calculated can the modules cooperating with the AI model of normal behavior can say with high confidence whether a data point is an anomaly or not. Anomaly detection can discover unusual data points in your dataset. Anomaly can be sometimes a synonym for the word 'outlier'.

Again, the AI models trained on a normal pattern of life of entities in a network (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US patent publication number US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US patent publication number US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, as discussed further below, during pre-deployment the cyber threat analyst module 120 and the analyzer module 115 can use data analysis processes and cooperate with AI model(s) 160 trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyzer module 115 can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI model(s) 160 trained on a normal pattern of life of entities in a domain under analysis may perform the threat detection through a probabilistic change in a normal behavior through the application of, for example, an unsupervised Bayesian mathematical model to detect a behavioral change in computers and computer networks. The Bayesian probabilistic approach can determine periodicity in multiple time series data and identify changes across single and multiple time series data for the purpose of anomalous behavior detection. In an example, a system being protected can include both email and IT network domains under analysis. Thus, email and IT network raw sources of data can be examined along with a large number of derived metrics that each produce time series data for the given metric.

Additional Module Interactions

Referring back to FIG. 5, the gather module 110 cooperates with the data store 135. The data store 135 stores comprehensive logs for network traffic observed. These logs can be filtered with complex logical queries and each IP packet can be interrogated on a vast number of metrics in the network information stored in the data store. Similarly, other domain's communications and data, such as emails, logs, etc. may be collected and stored in the data store 135. The gather module 110 may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gather module 110 for each possible hypothesis.

The data store 135 can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The gather module 110 may have a process identifier classifier. The process identifier classifier can identify and track each process and device in the network, under analysis, making communication connections. The data store 135 cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, data from any of the domains under analysis may be collected and compared.

Examples of domains/networks under analysis being protected can include any of i) an Informational Technology network, ii) an Operational Technology network, iii) a Cloud service, iv) a SaaS service, v) an endpoint device, vi) an email domain, and vii) any combinations of these. A domain module is constructed and coded to interact with and understand a specific domain.

For instance, the IT network domain module 145 may receive information from and send information to, in this example, IT network-based sensors (i.e., probes, taps, etc.). The IT network domain module 145 also has algorithms and components configured to understand, in this example, IT network parameters, IT network protocols, IT network activity, and other IT network characteristics of the network under analysis. The second domain module 150 is, in this example, an email module. The email domain module 150 can receive information from and send information to, in this example, email-based sensors (i.e., probes, taps, etc.). The email domain module 150 also has algorithms and components configured to understand, in this example, email parameters, email protocols and formats, email activity, and other email characteristics of the network under analysis. Additional domain modules, such as a cloud domain module can also collect domain data from another respective domain.

The coordinator module 155 is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier (not shown) in the gather module 110 can cooperate with additional classifiers in each of the domain modules 145/150 to assist in tracking individual processes and associating them with entities in a domain under analysis as well as individual processes and how they relate to each other. The process identifier classifier can cooperate with other trained AI classifiers in the modules to supply useful metadata along with helping to make logical nexuses.

A feedback loop of cooperation exists between the gather module 110, the analyzer module 115, AI model(s) 160 trained on different aspects of this process, and the cyber threat analyst module 120 to gather information to determine whether a cyber threat is potentially attacking the networks/domains under analysis.

Determination of Whether Something is Likely Malicious

In the following examples the analyzer module 115 and/or cyber threat analyst module 120 can use multiple factors to the determination of whether a process, event, object, entity, etc. is likely malicious.

In an example, the analyzer module 115 and/or cyber threat analyst module 120 can cooperate with one or more of the AI model(s) 160 trained on certain cyber threats to detect whether the anomalous activity detected, such as suspicious email messages, exhibit traits that may suggest a malicious intent, such as phishing links, scam language, sent from suspicious domains, etc. The analyzer module 115 and/or cyber threat analyst module 120 can also cooperate with one or more of the AI model(s) 160 trained on potential IT based cyber threats to detect whether the anomalous activity detected, such as suspicious IT links, URLs, domains, user activity, etc., may suggest a malicious intent as indicated by the AI models trained on potential IT based cyber threats.

In the above example, the analyzer module 115 and/or the cyber threat analyst module 120 can cooperate with the one or more AI models 160 trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyzer module 115 and/or the cyber threat analyst module 120 can cooperate with the one or more AI models trained with machine learning on the normal pattern of life for entities in a second domain under analysis (in this example, an IT network) to detect, in this example, anomalous network activity by user and/or devices in the network, which is detected as outside of the usual pattern of life (e.g. abnormal) for each entity, such as a user or a device, of the second domain's network under analysis.

Thus, the analyzer module 115 and/or the cyber threat analyst module 120 can be configured with one or more data analysis processes to cooperate with the one or more of the AI models 160 trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this cyber threat determination process, the analyzer module 115 and/or the cyber threat analyst module 120 can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models 160 trained on potential cyber threats and/or the AI classifiers looking at specific features for their malicious nature in order to make a determination of whether an individual factor and/or whether a chain of anomalies is determined to be likely malicious.

Initially, in this example of activity in an IT network analysis, the rare JA3 hash and/or rare user agent connections for this network coming from a new or unusual process are factored just like in the first wireless domain suspicious wireless signals are considered. These are quickly determined by referencing the one or more of the AI models 160 trained with machine learning on the pattern of life of each device and its associated processes in the system. Next, the analyzer module 115 and/or the cyber threat analyst module 120 can have an external input to ingest threat intelligence from other devices in the network cooperating with the cyber security appliance 100. Next, the analyzer module 115 and/or the cyber threat analyst module 120 can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analyzer module 115 and/or the cyber threat analyst module 120 can combine these Indicators of Compromise (e.g., unusual network JA3, unusual device JA3, . . . ) with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

Another example of features may include a deeper analysis of endpoint data. This endpoint data may include domain metadata, which can reveal peculiarities such as one or more indicators of potentially a malicious domain (i.e., its URL). The deeper analysis may assist in confirming an analysis to determine that indeed a cyber threat has been detected. The analyzer module 115 can also look at factors of how rare the endpoint connection is, how old the endpoint is, where geographically the endpoint is located, how a security certificate associated with a communication is verified only by an endpoint device or by an external 3rd party, just to name a few additional factors. The analyzer module 115 (and similarly the cyber threat analyst module 120) can then assign weighting given to these factors in the machine learning that can be supervised based on how strongly that characteristic has been found to match up to actual malicious sites in the training.

In another AI classifier is trained to find potentially malicious indicators. The agent analyzer data analysis process in the analyzer module 115 and/or cyber threat analyst module 120 may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client-server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The analyzer module 115 and/or the cyber threat analyst module 120 may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module 120 can use the agent analyzer data analysis process and the AI models(s) trained on forming and investigating hypotheses on what are a possible set of cyber threats to use the machine learning and/or set scripts to aid in forming one or more hypotheses to support or refute each hypothesis. The cyber threat analyst module 120 can cooperate with the AI models trained on forming and investigating hypotheses to form an initial set of possible hypotheses, which needs to be intelligently filtered down. The cyber threat analyst module 120 can be configured to use the one or more supervised machine learning models trained on i) agnostic examples of a past history of detection of a multitude of possible types of cyber threat hypotheses previously analyzed by human, who was a cyber security professional, ii) a behavior and input of how a plurality of human cyber security analysts make a decision and analyze a risk level regarding and a probability of a potential cyber threat, iii) steps to take to conduct an investigation start with anomaly via learning how expert humans tackle investigations into specific real and synthesized cyber threats and then the steps taken by the human cyber security professional to narrow down and identify a potential cyber threat, and iv) what type of data and metrics that were helpful to further support or refute each of the types of cyber threats, in order to determine a likelihood of whether the abnormal behavior and/or suspicious activity is either i) malicious or ii) benign?

The cyber threat analyst module 120 using AI models, scripts and/or rules based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

The cyber threat analyst module using AI models, scripts and/or rules-based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

In an example, a behavioural pattern analysis of what are the unusual behaviours of the network/system/device/user under analysis by the machine learning models may be as follows. The coordinator module can tie the alerts, activities, and events from, in this example, the email domain to the alerts, activities, and events from the IT network domain. FIG. 7 illustrates a graph 220 of an embodiment of an example chain of unusual behaviour for, in this example, the email activities and IT network activities deviating from a normal pattern of life in connection with the rest of the system/network under analysis. The cyber threat analyst module and/or analyzer module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behaviour of a malicious actor-human, program, or other threat. The cyber threat analyst module can go back and pull in some of the normal activities to help support or refute a possible hypothesis of whether that pattern is indicative of a behavior of a malicious actor. An example behavioral pattern included in the chain is shown in the graph over a time frame of, an example, 7 days. The cyber threat analyst module detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. Again, the cyber security appliance 100 can go back and pull in some of the normal activities to help support or refute a possible hypothesis of whether that pattern is indicative of a behaviour of a malicious actor. The analyser module can cooperate with one or more models trained on cyber threats and their behaviour to try to determine if a potential cyber threat is causing these unusual behaviours. The cyber threat analyst module can put data and entities into 1) a directed graph and nodes in that graph that are overlapping or close in distance have a good possibility of being related in some manner, 2) a vector diagram, 3) a relational database, and 4) other relational techniques that will at least be examined to assist in creating the chain of related activity connected by causal links, such as similar time, similar entity and/or type of entity involved, similar activity, etc., under analysis. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviours under analysis, that are equal to or above a configurable level of threat posed by this malicious actor.

The autonomous response engine 140 of the cyber security system is configured to take one or more autonomous mitigation actions to mitigate the cyber threat during the cyberattack by the cyber threat. The autonomous response engine 140 is configured to reference an Artificial Intelligence model trained to track a normal pattern of life for each node of the protected system to perform an autonomous act of restricting a potentially compromised node having i) an actual indication of compromise and/or ii) merely adjacent to a known compromised node, to merely take actions that are within that node's normal pattern of life to mitigate the cyber threat. Similarly named components in the cyber security restoration engine 190 can operate and function similar to as described for the detection engine.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

An Assessment of the Cyber Threat in Order to Determine Appropriate Autonomous Actions, for Example, Those by the Autonomous Response Engine 140

In the next step, the analyzer module and/or cyber threat analyst module generates one or more supported possible cyber threat hypotheses from the possible set of cyber threat hypotheses. The analyzer module generates the supporting data and details of why each individual hypothesis is supported or not. The analyzer module can also generate one or more possible cyber threat hypotheses and the supporting data and details of why they were refuted.

In general, the analyzer module cooperates with the following three sources. The analyzer module cooperates with the AI models trained on cyber threats to determine whether an anomaly such as the abnormal behavior and/or suspicious activity is either 1) malicious or 2) benign when the potential cyber threat under analysis is previously unknown to the cyber security appliance 100. The analyzer module cooperates with the AI models trained on a normal behavior of entities in the network under analysis. The analyzer module cooperates with various AI-trained classifiers. With all of these sources, when they input information that indicates a potential cyber threat that is i) severe enough to cause real harm to the network under analysis and/or ii) a close match to known cyber threats, then the analyzer module can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat.

In the next step, an assessment module with the AI classifiers is configured to cooperate with the analyzer module. The analyzer module supplies the identity of the supported possible cyber threat hypotheses from the possible set of cyber threat hypotheses to the assessment module. The assessment module with the AI classifiers cooperates with the AI model trained on possible cyber threats can make a determination on whether a cyber threat exists and what level of severity is associated with that cyber threat. The assessment module with the AI classifiers cooperates with the one or more AI models trained on possible cyber threats in order to assign a numerical assessment of a given cyber threat hypothesis that was found likely to be supported by the analyzer module with the one or more data analysis processes, via the abnormal behavior, the suspicious activity, or the collection of system data points. The assessment module with the AI classifiers output can be a score (ranked number system, probability, etc.) that a given identified process is likely a malicious process.

The assessment module with the AI classifiers can be configured to assign a numerical assessment, such as a probability, of a given cyber threat hypothesis that is supported and a threat level posed by that cyber threat hypothesis which was found likely to be supported by the analyzer module, which includes the abnormal behavior or suspicious activity as well as one or more of the collection of system data points, with the one or more AI models trained on possible cyber threats.

The cyber threat analyst module in the AI-based cyber security appliance 100 component provides an advantage over competitors' products as it reduces the time taken for cybersecurity investigations, provides an alternative to manpower for small organizations and improves detection (and remediation) capabilities within the cyber security platform.

The AI-based cyber threat analyst module performs its own computation of threat and identifies interesting network events with one or more processors. These methods of detection and identification of threat all add to the above capabilities that make the AI-based cyber threat analyst module a desirable part of the cyber security appliance 100. The AI-based cyber threat analyst module offers a method of prioritizing which is not just a summary or highest score alert of an event evaluated by itself equals the most bad, and prevents more complex attacks being missed because their composite parts/individual threats only produced low-level alerts.

The AI classifiers can be part of the assessment component, which scores the outputs of the analyzer module. Again, as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module can generate an output such as a printed or electronic report with the relevant data. The formatting module can cooperate with both the analyzer module and the assessment module depending on what the user wants to be reported.

The formatting module is configured to format, present a rank for, and output one or more supported possible cyber threat hypotheses from the assessment module into a formalized report, from one or more report templates populated with the data for that incident.

The formatting module is configured to format, present a rank for, and output one or more detected cyber threats from the analyzer module or from the assessment module into a formalized report, from one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three. The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat. The formatting module can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module with the AI classifiers, once armed with the knowledge that malicious activity is likely occurring/is associated with a given process from the analyzer module, then cooperates with the autonomous response engine 140 to take an autonomous action such as i) deny access in or out of the device or the network and/or ii) shutdown activities involving a detected malicious agent.

The autonomous response engine 140, rather than a human taking an action, can be configured to cause one or more rapid autonomous mitigation actions to be taken to counter the cyber threat. A user interface for the response module can program the autonomous response engine 140 i) to merely make a suggested response to take to counter the cyber threat that will be presented on a display screen and/or sent by a notice to an administrator for explicit authorization when the cyber threat is detected or ii) to autonomously take a response to counter the cyber threat without a need for a human to approve the response when the cyber threat is detected. The autonomous response engine 140 will then send a notice of the autonomous response as well as display the autonomous response taken on the display screen. Example autonomous responses may include cut off connections, shutdown devices, change the privileges of users, delete and remove malicious links in emails, slow down a transfer rate, and other autonomous actions against the devices and/or users. The autonomous response engine 140 uses one or more Artificial Intelligence models that are configured to intelligently work with other third-party defense systems in that customer's network against threats. The autonomous response engine 140 can send its own protocol commands to devices and/or take actions on its own. In addition, the autonomous response engine 140 uses the one or more Artificial Intelligence models to orchestrate with other third-party defense systems to create a unified defense response against a detected threat within or external to that customer's network. The autonomous response engine 140 can be an autonomous self-learning response coordinator that is trained specifically to control and reconfigure the actions of traditional legacy computer defenses (e.g., firewalls, switches, proxy servers, etc.) to contain threats propagated by, or enabled by, networks and the internet. The cyber threat module can cooperate with the autonomous response engine 140 to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The trigger module, analyzer module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

Again, the multiple (e.g., four) Artificial Intelligence-based engines have communication hooks in between them to exchange a significant amount of behavioral metrics including data between the multiple Artificial Intelligence-based engines to work in together to provide an overall cyber threat response. The AI adaptive incident response loop has interaction and orchestration between the multiple (four) self-learning AI components, each trained and focused on their individual machine-learned tasks of i) detecting a cyber threat, ii) how to conduct a simulation and make the prediction about a cyberattack, iii) how to make and what types of autonomous mitigation responses can be made in response to a cyberattack and iv) what level of restrictions are needed and how to invoke restoration actions to restore nodes in the system being protected while still mitigating effects of the cyberattack. The Artificial Intelligence in each of the engines trained and focused on performing their corresponding machine-learned tasks as well as the orchestration between the Artificial Intelligence-based engines drive the exchange to make them work in together against a cyberattack by the cyber threat (e.g., malicious actor). The intelligent orchestration component facilitates the multiple example stages of the Artificial Intelligence augmented and adaptive interactive response loop between these four Artificial Intelligence-based engines.

FIG. 1 illustrates a diagram of an example interactive Artificial Intelligence-based response loop between the multiple Artificial Intelligence-based engines working in tandem to provide an overall cyber threat response and their cooperation with the LLMs. The cyber-attack simulator after running the Artificial Intelligence-based simulations communicates to the autonomous response engine 140 the locations where it could block the likely and/dangerous next moves by the attacker. The Artificial Intelligence in the autonomous response engine 140 analyzes the simulation results and grabs any additional information needed to decide what nodes need autonomous actions and what mitigation actions to take to each node that is compromised and potentially its neighboring nodes. The Artificial Intelligence in the autonomous response engine 140 reasons and takes action. The AI engines also update the report visible to the human cyber security team.

This interactive Artificial Intelligence-based response loop between the multiple Artificial Intelligence-based engines working together continues on. The intelligent orchestration component uses unsupervised machine learning algorithms to self-learn from previous cyber threat incidents (and their aftermath) on tasks such as how the response went, what worked, what did not, how long things took and how this compared to previous occasions and to expectations, and then uses this information to adjust future incident response expectations and priorities. The intelligent orchestration component can use action success/completion and time taken as measures of improvement. Likewise, the restoration engine can use unsupervised machine learning algorithms to self-learn from previous cyber threat incidents to get better at healing the system being protected to mitigate the cyber threat while minimizing an impact on the system being protected. Likewise, the cyber security restoration engine 190 can use one or more unsupervised machine learning algorithms, as a self-learning entity, to have an ability to learn how to restore the one or more nodes in the graph of the protected system back to the trusted operational state while still mitigating against the cyber threat so the cyber security restoration engine 190 gets better over time of a deployment of the cyber security restoration engine 190 by learning from previous restoration attempts (e.g. action success/completion and time taken as measures, action effectiveness as a measure, etc., as well as including or adapting changes to previous recommendations made by the human security team.

The cyber threat detection engine, the autonomous response engine 140, the cyber-attack simulator all perform their machine-learned task and send inputs to each other to assist in determining what nodes are impacted, what cyber threat is causing the problems, and how the cyberattack likely occurred and will progress based upon possible mitigation and restoration actions taken so that the restoration engine can rely on the determinations by the Artificial Intelligence in those AI-based engines to give the restoration engine a fantastic starting point for figuring out what is the system being protected is trying to recover from and then a best way to restore the nodes in the system.

There are four discrete AI-based engines working to achieve aims with their own machine learning approaches. Each separate AI contributes data that has been processed intelligently through machine learning approaches and then hands over the processed behavioral metrics to another AI engine which then performs its own individualized machine-learned task.

The cyber-attack simulator 105 in conducting simulations can use the cyber threat analyst module with external data input (e.g., crowdstrike) and cooperate with the detection engine to identify an infected patient zero and additional devices actually compromised and/or directly linked to devices actually compromised in need of remediation. The linked devices or the activity may not be directly visible to the detection engine alone and the external data input fills in the big picture. The cyber security restoration engine 190 to restore the protected system can potentially use the external data input that the system is receiving from third party integrations (e.g., from host-based agents from 3rd party vendors, antivirus and-based testing antivirus, etc. to identify patient zero of the attack, identify, where the attack has happened and is happening, identify devices that the system reasonably believes are linked to the compromised entity, and recommend remediation or perform remediation via AI alone, and/or AI in combination with human assistance. The cyber security restoration engine 190 can restore the protected system back to a state before a compromise (e.g., abnormalities started) by a cyber threat occurred in the protected system. The cyber security restoration engine 190 restores nodes in the protected system to cyberattacks in progress-so heals in real time, as an attack happens, as well as can assist in healing after an attack has taken place.

The trusted operational state of a node can be an operational state for a date and time before the earliest detection of a possible compromise of a node in the graph (device and/or user account) plus a threshold buffer amount of time.

In an example, the detection engine can use historic IaaS data on virtual resource usage to identify errant virtual resources and the autonomous response engine 140 to spin down those resources or disable overactive microservices like lambdas. In another example, the detection engine can use historic IaaS data on virtual resource usage to understand when a client is undergoing some kind of DDOS and the autonomous response engine 140 acts to do scaling to handle the load until the overload is over. The restoration engine can recommend controlling the scaling when the system understands deliberate overloading of traffic is occurring and then bringing that scaling back down again to assist their service architectures to deal with situations when some cyber threat is trying to overload those systems to bring that customer down.

In another example, the cyber security restoration engine 190 to restore the protected system can use historic source codebase information and modelling from the AI models in the detection engine for development to revert commits and code changes that potentially introduce bad or compromised code. The cyber security restoration engine 190 to restore the protected system can also use historic records of a source code database information to find out when during the development of a product that the cyber-attack occurred on the source code in order to restore the source code back to the state before the compromise occurred, as well as use historic code base analysis and understanding to identify supply chain and products vulnerable to bad code/compromised code and sending an update package/at least a notice to revert those products and further prevent the source code vulnerabilities from trickling down the supply chains from the vendor to the end user. Once file data of a cyber threat is identified, then that file data and its characteristics are captured in an inoculation package and then cascade that file information to each cyber security appliance in the fleet of cyber security appliances, and quarantine the identical and very similar files in order to remove them from all of the environments before anything can spread even more than it has via immediate remediation and also using the system's own inoculation data.

In an example, the autonomous response engine 140 can stop a device that is infected from connecting to other nodes. In addition, the autonomous response engine 140 can restrict reading and writing traffic and/or types of data/information being communicated in that traffic to restrict traffic movement and process activity to nodes close to an entity that the system thinks is performing erroneously or infected.

Referring to FIG. 5, the autonomous response engine 140 is configured to use one or more Application Programming Interfaces to translate desired mitigation actions for nodes (devices, user accounts, etc.) into a specific language and syntax utilized by that device, user account, etc. from potentially multiple different vendors being protected in order to send the commands and other information to cause the desired mitigation actions to change, for example, a behavior of a detected threat of a user and/or a device acting abnormal to the normal pattern of life. The selected mitigation actions on the selected nodes minimize an impact on other parts of the system being protected (e.g., devices and users) that are i) currently active in the system being protected and ii) that are not in breach of being outside the normal behavior benchmark. The autonomous response engine 140 can have a discovery module to i) discover capabilities of each node being protected device and the other cyber security devices (e.g., firewalls) in the system being protected and ii) discover mitigation actions they can take to counter and/or contain the detected threat to the system being protected, as well as iii) discover the communications needed to initiate those mitigation actions.

For example, the autonomous response engine 140 cooperates and coordinates with an example set of network capabilities of various network devices. The network devices may have various capabilities such as identity management including setting user permissions, network security controls, firewalls denying or granting access to various ports, encryption capabilities, centralize logging, antivirus anti-malware software quarantine and immunization, patch management, etc., and also freeze any similar, for example, network activity, etc. triggering the harmful activity on the system being protected.

Accordingly, the autonomous response engine 140 will take an autonomous mitigation action to, for example, shutdown the device or user account, block login failures, perform file modifications, block network connections, restrict the transmission of certain types of data, restrict a data transmission rate, remove or restrict user permissions, etc. The autonomous response engine 140 for an email system could initiate example mitigation actions to either remedy or neutralize the tracking link, when determined to be the suspicious covert tracking link, while not stopping every email entering the email domain with a tracking link, or hold the email communication entirely if the covert tracking link is highly suspicious, and also freeze any similar, for example, email activity triggering the harmful activity on the system being protected.

The autonomous response engine 140 has a default set of autonomous mitigation actions shown on its user interface that it knows how to perform when the different types of cyber threats are equal to or above a user configurable threshold posed by this type of cyber threat. The autonomous response engine 140 is also configurable in its user interface to allow the user to augment and change what type of automatic mitigation actions, if any, the autonomous response engine 140 may take when different types of cyber threats that are equal to or above the configurable level of threat posed by a cyber threat.

The autonomous response engine 140 can also reference its artificial intelligence trained to perform mitigation actions. Again, the autonomous response engine 140 has an administrative tool in its user interface to program/set what autonomous mitigation actions the autonomous response engine 140 can take, including types of mitigation actions and specific mitigation actions the autonomous response engine 140 is capable of, when the cyber-threat module in the detection engine indicates the threat risk parameter is equal to or above the actionable threshold, selectable by the cyber professional. The cyber professional can also indicate what types of mitigation actions can be performed for different users and parts of the system as well as what actions need the cyber professional to approve. Again, the autonomous response engine 140 can also reference a default library of mitigation actions, types of mitigation actions and specific mitigation actions the autonomous response engine 140 is capable of on a particular node.

Referring to FIG. 4, the cyber-attack simulator 105 using Artificial Intelligence-based simulations is communicatively coupled to a cyber security appliance 100, an open source (OS) database server 790, an email system 796, one or more endpoint computing devices 791A-B, and an IT network system 792 with one or more entities, over one or more networks 791/792 in the system being protected.

The cyber-attack simulator 105 with Artificial Intelligence-based simulations is configured to integrate with the cyber security appliance 100 and cooperate with components within the cyber security appliance 100 installed and protecting the network from cyber threats by making use of outputs, data collected, and functionality from two or more of a data store, other modules, and one or more AI models already existing in the cyber security appliance 100.

The cyber-attack simulator 105 may include a cyber threat generator module to generate many different types of cyber threats with the past historical attack patterns to attack the simulated system to be generated by the simulated attack module 750 that will digitally/virtually replicate the system being protected, such as a phishing email generator configured to generate one or more automated phishing emails to pentest the email defenses and/or the network defenses provided by the cyber security appliance 100. For example, the system being protected can be an email system and then the phishing email generator may be configured to cooperate with the trained AI models to customize the automated phishing emails based on the identified data points of the organization and its entities.

The email module and IT network module may use a vulnerability tracking module to track and profile, for example, versions of software and a state of patches and/or updates compared to a latest patch and/or update of the software resident on devices in the system/network. The vulnerability tracking module can supply results of the comparison of the version of software as an actual detected vulnerability for each particular node in the system being protected, which is utilized by the node exposure score generator and the cyber-attack simulator 105 with Artificial Intelligence-based simulations in calculating 1) the spread of a cyber threat and 2) a prioritization of remediation actions on a particular node compared to the other network nodes with actual detected vulnerabilities. The node exposure score generator is configured to also factor in whether the particular node is exposed to direct contact by an entity generating the cyber threat (when the threat is controlled from a location external to the system e.g., network) or the particular node is downstream of a node exposed to direct contact by the entity generating the cyber threat external to the network.

The node exposure score generator and the simulated attack module 750 in the cyber-attack simulator 105 cooperate to run the one or more hypothetical simulations of an actual detected cyber threat incident and/or a hypothetical cyberattack incident to calculate the node paths of least resistance in the virtualized instance/modeled instance of the system being protected. The progress through the node path(s) of least resistance through the system being protected are plotted through the various simulated instances of components of the graph of the system being protected until reaching a suspected end goal of the cyber-attack scenario, all based on historic knowledge of connectivity and behavior patterns of users and devices within the system under analysis. The simulated attack module 750, via a simulator and/or a virtual network clone creator, can be programmed to model and work out the key paths and devices in the system (e.g., a network, with its nets and subnets,) via initially mapping out the system being protected and querying the cyber security appliance on specific's known about the system being protected by the cyber security appliance 100. The simulated attack module 750 is configured to search and query, two or more of i) a data store, ii) modules in the detection engine, and iii) the one or more Artificial Intelligence (AI) models making up the cyber security appliance 100 protecting the actual network under analysis from cyber threats, on what, i) the data store, ii) the modules, and iii) the one or more AI models in the cyber security appliance 100, already know about the nodes of the system, under analysis to create the graph of nodes of the system being protected. Thus, the cyber-attack simulator 105 with Artificial Intelligence-based simulations is configured to construct the graph of the virtualized version of the system from knowledge known and stored by modules, a data store, and one or more AI models of a cyber security appliance 100 protecting an actual network under analysis. The knowledge known and stored is obtained at least from ingested traffic from the actual system under analysis. Thus, the virtualized system, and its node components/accounts connecting to the network, being tested during the simulation are up to date and accurate for the time the actual system under analysis is being tested and simulated because the cyber-attack simulator 105 with Artificial Intelligence-based simulations is configured to obtain actual network data collected by two or more of 1) modules, 2) a data store, and 3) one or more AI models of a cyber security appliance protecting the actual network under analysis from cyber threats. The simulated attack module 750 will make a model incorporating the actual data of the system through the simulated versions of the nodes making up that system for running simulations on the simulator. Again, a similar approach is taken when the simulated attack module 750 uses a clone creator to spin up and create a virtual clone of the system being protected with virtual machines in the cloud.

The cyber-attack simulator 105 with Artificial Intelligence-based simulations is configured to simulate the compromise of a spread of the cyber threat being simulated in the simulated cyber-attack scenario, based on historical and/or similar cyber threat attack patterns, between the devices connected to the virtualized network, via a calculation on an ease of transmission of the cyber threat algorithm, from 1) an originally compromised node by the cyber threat, 2) through to other virtualized/simulated instances of components of the virtualized network, 3) until reaching a suspected end goal of the cyber-attack scenario, including key network devices. The cyber-attack simulator 105 with Artificial Intelligence-based simulations also calculates how likely it would be for the cyber-attack to spread to achieve either of 1) a programmable end goal of that cyber-attack scenario set by a user, or 2) set by default an end goal scripted into the selected cyber-attack scenario.

The email module and the IT network module can include a profile manager module. The profile manager module is configured to maintain a profile tag on all of the devices connecting to the actual system/network under analysis based on their behavior and security characteristics and then supply the profile tag for the devices connecting to the virtualized instance of the system/network when the construction of the graph occurs. The profile manager module is configured to maintain a profile tag for each device before the simulation is carried out; and thus, eliminates a need to search and query for known data about each device being simulated during the simulation. This also assists in running multiple simulations of the cyberattack in parallel.

The cyber-attack simulator 105 with Artificial Intelligence-based simulations module is configured to construct the graph of the virtualized system, e.g. a network with its nets and subnets, where two or more of the devices connecting to the virtualized network are assigned with different weighting resistances to malicious compromise from the cyber-attack being simulated in the simulated cyber-attack scenario based on the actual cyber-attack on the virtualized instance of the network and their node vulnerability score. In addition to a weighting resistance to the cyberattack, the calculations in the model for the simulated attack module 750 factor in the knowledge of a layout and connection pattern of each particular network device in a network, an amount of connections and/or hops to other network devices in the network, how important a particular device (a key importance) determined by the function of that network device, the user(s) associated with that network device, and the location of the device within the network. Note, multiple simulations can be conducted in parallel by the orchestration module. The simulations can occur on a periodic regular basis to pentest the cyber security of the system and/or in response to a detected ongoing cyberattack in order to get ahead of the ongoing cyberattack and predict its likely future moves. Again, the graph of the virtualize instance of the system is created with two or more of 1) known characteristics of the network itself, 2) pathway connections between devices on that network, 3) security features and credentials of devices and/or their associated users, and 4) behavioral characteristics of the devices and/or their associated users connecting to that network, which all of this information is obtained from what was already know about the network from the cyber security appliance.

During an ongoing cyberattack, the simulated attack module 750 is configured to run the one or more hypothetical simulations of the detected cyber threat incident and feed details of a detected incident by a cyber threat module in the detection engine into the collections module of the cyber-attack simulator 105 using Artificial Intelligence-based simulations. The simulated attack module 750 is configured to run one or more hypothetical simulations of that detected incident in order to predict and assist in the triggering an autonomous response by the autonomous response engine 140 and then restoration by the restoration engine to the detected incident.

The simulated attack module 750 ingests the information for the purposes of modeling and simulating a potential cyberattacks against the network and routes that an attacker would take through the network. The simulated attack module 750 can construct the graph of nodes with information to i) understand an importance of network nodes in the network compared to other network nodes in the network, and ii) to determine key pathways within the network and vulnerable network nodes in the network that a cyber-attack would use during the cyber-attack, via modeling the cyber-attack on at least one of 1) a simulated device version and 2) a virtual device version of the system being protected under analysis. Correspondingly, the calculated likelihood of the compromise and timeframes for the spread of the cyberattack is tailored and accurate to each actual device/user account (e.g., node) being simulated in the system because the cyber-attack scenario is based upon security credentials and behavior characteristics from actual traffic data fed to the modules, data store, and AI models of the cyber security appliance.

The cyber-attack simulator 105 with its Artificial Intelligence trained on how to conduct and perform cyberattack in a simulation in either a simulator or in a clone creator spinning up virtual instances on virtual machines will take a sequence of actions and then evaluate the actual impact after each action in the sequence, in order to yield a best possible result to contain/mitigate the detected threat while minimizing the impact on other network devices and users that are i) currently active and ii) not in breach, from different possible actions to take. Again, multiple simulations can be run in parallel so that the different sequences of mitigation actions and restoration actions can be evaluated essentially simultaneously. The cyber-attack simulator 105 with Artificial Intelligence-based simulations in the cyber-attack simulator 105 is configured to use one or more mathematical functions to generate a score and/or likelihood for each of the possible actions and/or sequence of multiple possible actions that can be taken in order to determine which set of actions to choose among many possible actions to initiate. The one or more possible actions to take and their calculated scores can be stacked against each other to factor 1) a likelihood of containing the detected threat acting abnormal with each possible set of actions, 2) a severity level of the detected threat to the network, and 3) the impact of taking each possible set of actions i) on users and ii) on devices currently active in the network not acting abnormal to the normal behavior of the network, and then communicate with the cyber threat detection engine, the autonomous response engine 140, and the cyber-security restoration engine 190, respectively, to initiate the chosen set of actions to cause a best targeted change of the behavior of the detected threat acting abnormal to the normal pattern of life on the network while minimizing the impact on other network devices and users that are i) currently active and ii) not in breach of being outside the normal behavior benchmark. The cyber-attack simulator cooperates with the AI models modelling a normal pattern of life for entities/nodes in the system being protected.

The simulated attack module 750 is programmed itself and can cooperate with the artificial intelligence in the restoration engine to factor an intelligent prioritization of remediation actions and which nodes (e.g., devices and user accounts) in the simulated instance of the system being protected should have a priority compared to other nodes. This can also be reported out to assist in allocating human security team personnel resources that need human or human approval to restore the nodes based on results of the one or more hypothetical simulations of the detected incident.

Note, the cyberattack simulator 105, when doing attack path modelling, does not need to not calculate every theoretically possible path from the virtualized instance of the source device to the end goal of the cyber-attack scenario but rather a set of the most likely paths, each time a hop is made from one node in the virtualized network to another device in the virtualized network, in order to reduce an amount of computing cycles needed by the one or more processing units as well as an amount of memory storage needed in the one or more non-transitory storage mediums.

FIG. 6 shows the AI-based cyber security appliance 100 and the interactive cyber-security user-interface for cyber-security components 182 with the LLMs plugging in as an appliance platform to protect a network. The probes and detectors monitor, in this example, email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

Referring back to FIG. 5, a computer system within a building, can use the cyber security appliance 100 to detect and thereby attempt to prevent threats to computing devices within its bounds. In this exemplary embodiment of the cyber security appliance 100 with the multiple Artificial Intelligence-based engines is implemented on a computer. The computer has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in the computer builds and maintains a dynamic, ever-changing model of the 'normal behavior' of each user and machine within the system. The approach is based on Bayesian mathematics, and monitors all interactions, events, and communications within the system-which computer is talking to which, files that have been created, networks that are being accessed.

For example, a second computer is-based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation and/or autonomous action.

The cyber security appliance 100 is built to deal with the fact that today's attackers are getting stealthier and an attacker/malicious agent may be 'hiding' in a system to ensure that they avoid raising suspicion in an end user, such as by slowing their machine down. The Artificial Intelligence model(s) in the cyber security appliance 100 builds a sophisticated 'pattern of life'—that understands what represents normality for every person, device, and network activity in the system being protected by the cyber security appliance 100.

The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The detection engine self-learning AI can learn "on the job" from real-world data occurring in the system and constantly evolves its understanding as the system's environment changes. The Artificial Intelligence can use machine learning algorithms to analyze patterns and 'learn' what is the 'normal behavior' of the network by analyzing data on the activity on the network at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised Learning can break down features of what it is analyzing (e.g., a network node of a device or user account), which can be useful for categorization, and then identify what else has similar or overlapping feature sets matching to what it is analyzing.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance's 100 unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network-even when it does not know what it is looking for.

The models in the cyber security appliance 100 can use a Recursive Bayesian Estimation to combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature-based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

The AI classifier can receive supervised machine learning with a labeled data set to learn to perform their task as discussed herein. An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The methods and systems shown in the Figures and discussed in the text herein can be coded to be performed, at least in part, by one or more processing components with any portions of software stored in an executable format on a computer readable medium. Thus, any portions of the method, apparatus and system implemented as software can be stored in one or more non-transitory storage devices in an executable format to be executed by one or more processors. The computer readable storage medium may be non-transitory and does not include radio or other carrier waves. The computer readable storage medium could be, for example, a physical computer readable storage medium such as semiconductor memory or solid-state memory, magnetic tape, a removable computer diskette, a random-access memory (RAM), a read-only memory (ROM), a rigid magnetic disc, and an optical disk, such as a CD-ROM, CD-R/W or DVD. The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

FIG. 9 illustrates a block diagram of an embodiment of one or more computing devices that can be a part of the Artificial Intelligence-based cyber security system including the multiple Artificial Intelligence-based engines and the interactive cyber-security user-interface for cybersecurity components with its LLMs discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software. In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball, or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB).

A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device, or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. A software engine is a core component of a complex system consisting of hardware and software that is capable of performing its function discretely from other portions of the entire complex system but designed to interact with the other portions of the entire complex system.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:

an interactive cyber-security user-interface for cybersecurity components that is configured to receive i) a voice input as well as ii) a text input from a user as a user input, where the interactive cyber-security user-interface for the cybersecurity components is configured to work with a set of two or more differently trained large language models (LLMs) to carry out tasks on behalf of the user input, where the interactive cyber-security user-interface for the cybersecurity components is configured to cooperate with the set of two or more differently trained LLMs, which are grouped together to operate as an orchestrated system to provide two or more different tasks;

wherein the set of two or more differently trained LLMs includes a search-syntax task dedicated LLM, where the user input is expressed in a natural human speech, where the search-syntax task dedicated LLM is trained to create corresponding pairs between a concept expressed in a formal grammar of a portion of the natural human speech to a meaning and a role level corresponding to that portion of the natural human speech, and then map the meaning and the role level of the portion of the natural human speech to a proper search syntax format utilized by at least one of i) a third-party service and ii) the cybersecurity components that corresponds to the proper search syntax format;

where the interactive cyber-security user-interface for the cybersecurity components is configured to cooperate with one or more of the cybersecurity components including i) a cyber security appliance with a cyber threat detect engine to detect a cyber threat in one or more of an email system, an Information Technology network, a cloud network, and any combination of these, ii) a proactive threat notification service to publicize new and ongoing cyber threats, iii) a cyber threat autonomous response engine to take one or more actions to mitigate a detected cyber threat, iv) a cyberattack simulator to simulate a cyberattack, v) a cyberattack restoration engine to restore network components back to an operational state prior to the cyberattack, and vi) an artificial intelligence-based cyber threat analyst module to investigate a chain of two or more minor anomalies linked to each other over a time frame of examination spanning two or more days; and where instructions implemented in software for the cybersecurity components and the LLMs are configured to be stored in one or more non-transitory storage mediums to be executed by one or more processing units.

2. The apparatus of claim 1, where an orchestrator LLM of the set of two or more differently trained LLMs is configured to receive the user input of voice or text, and is trained to apply a language comprehension functionality on the user input in order to generate a consistent version of a request indicated by the user input, which is then fed as an output fed to one or more of a set of task dedicated LLMs to be invoked, where an API-integration task dedicated LLM is configured to receive the request indicated by the user input and then is trained to carry out the request with one or more of the cybersecurity components, where the orchestrator LLM is further trained to orchestrate the tasks performed by the set of tasks dedicated LLMs, where the set of task dedicated LLMs are also part of the set of two or more differently trained LLMs.

3. The apparatus of claim 1, where a user-support task dedicated LLM is part of the set of two or more differently trained LLMs, where the user-support task dedicated LLM is trained to act as a first line of support for user queries regarding at least one of 1) troubleshooting issues with the cybersecurity components, 2) providing cyber analyst answers as a suggested response to the cyber security issue to the user, and 3) a current cyber threat landscape and current active cyber threats, while the user is waiting for an actual human cyber analyst to pick up and review their inquiry.

4. The apparatus of claim 1, where an API-integration task dedicated LLM is part of the set of two or more differently trained LLMs, where the API-integration task dedicated LLM is trained on a task of setting up APIs to one or more of the cybersecurity components as well as to APIs of third party services to obtain a collection of supplementary information.

5. The apparatus of claim 1, where a breach-summarization task dedicated LLM is part of the set of two or more differently trained LLMs, where the breach-summarization task dedicated LLM is trained to receive a history of breaches and their severity scores to produce both a summarization of cyber security information including those breaches as well as to provide recommendations to prioritize those breaches against each other to help the user.

6. The apparatus of claim 1, where an orchestrator LLM in the set of two or more differently trained LLMs has its training fine-tuned, where the training of the orchestrator LLM starts with selecting an already trained LLM model into performing a task and then unlocking one or more layers and parameters of the orchestrator LLM and fine tuning a machine learning of the unlocked layers and parameter on new data to perform one of the different tasks of i) the collection of supplementary information, ii) the summarization of cyber security information, or iii) the suggested response to the cyber security issue.

7. A method to provide cybersecurity, comprising:
providing an interactive cyber-security user-interface for cybersecurity components to receive a voice input from a user as a user input;
providing the interactive cyber-security user-interface for the cybersecurity components to work with a set of two or more differently trained large language models (LLMs) to carry out tasks on behalf of the user input;
providing the interactive cyber-security user-interface for the cybersecurity components to cooperate with the set of two or more differently trained LLMs, which are grouped together to operate as an orchestrated system to provide two or more different tasks;
wherein the set of two or more differently trained LLMs includes a user-support task dedicated LLM; wherein the user-support task dedicated LLM is trained to act as a first line of support for user inquiries to provide a suggested response to a cyber security issue; wherein the user-support task dedicated LLM has been trained on a historic corpus of user inquiries submitted to an expert human cyber analyst to understand how the expert human cyber analyst would resolve the user inquiries and then supply the suggested response to the cyber security issue to the user while the user is waiting for an actual human cyber analyst to pick up and review their inquiry; and
providing the interactive cyber-security user-interface for the cybersecurity components to cooperate with one or more of the cybersecurity components including i) a cyber security appliance with a cyber threat detect engine to detect a cyber threat in one or more of an email system, an Information Technology network, a cloud network, and any combination of these, ii) a proactive threat notification service to publicize new and ongoing cyber threats, iii) a cyber threat autonomous response engine to take one or more actions to mitigate a detected cyber threat, iv) a cyberattack simulator to simulate a cyberattack, v) a cyber-attack restoration engine to restore network components back to an operational state prior to the cyberattack, and vi) an artificial intelligence-based cyber threat analyst module to investigate a chain of two or more minor anomalies linked to each other over a time frame of examination spanning two or more days.

8. The method of claim 7, further comprising:
providing an orchestrator LLM of the set of two or more differently trained LLMs to receive the user input of voice or text, and is trained to apply a language comprehension functionality on the user input in order to generate a consistent version of a request indicated by the user input, which is then fed as an output fed to one or more of a set of task dedicated LLMs to be invoked; and
providing an API-integration task dedicated LLM to receive the request indicated by the user input, which is trained to carry out the request with one or more of the cybersecurity components, where the orchestrator LLM is further trained to orchestrate the tasks performed by the set of tasks dedicated LLMs, where the set of task dedicated LLMs are also part of the set of two or more differently trained LLMs.

9. The method of claim 7, further comprising:

providing a set of task dedicated LLMs as part of the set of two or more differently trained LLMs; and providing the set of task dedicated LLMs to include two or more of a following 1) an API-integration task dedicated LLM trained to act as an assistant that submits data to at least one of i) a third-party service and ii) the cybersecurity components using training on how to integrate with an API of that third party service or cybersecurity component to obtain a collection of the supplementary information, 2) a search-syntax task dedicated LLM trained on a search syntax required by at least one of i) the third-party service and ii) the cybersecurity components to allow users to query in natural human speech, and the second task dedicated LLM trained to translate the query in the natural human speech into the search syntax required, 3) a breach-summarization task dedicated LLM trained to be fed a history of model breaches and their severity scores and then the breach-summarization task dedicated LLM produces both a summarization of the cyber security information including the model breaches as well as provides recommendations, and 4) a user-support task dedicated LLM trained to act as a first line of support for user inquiries to provide a suggested response to the cyber security issue.

10. The method of claim 7, further comprising:

providing an API-integration task dedicated LLM as part of the set of two or more differently trained LLMs; and providing the API-integration task dedicated LLM, which is trained on a task of setting up APIs to one or more of the cybersecurity components as well as to APIs of third party services to obtain a collection of supplementary information.

11. The method of claim 7, further comprising:

providing a search-syntax task dedicated LLM as part of the set of two or more differently trained LLMs; and providing the search-syntax task dedicated LLM, which is trained on a task of formatting a query from the user input into a search syntax utilized by at least one of i) a third-party service and ii) the cybersecurity components to go out and find whatever the user is asking for in the user input made in a natural human speech but the search-syntax task dedicated LLM has translated the query from the user input into the search syntax utilized by the third-party service or the cybersecurity components.

12. The method of claim 7, further comprising:

providing a breach-summarization task dedicated LLM as part of the set of two or more differently trained LLMs; and providing the breach-summarization task dedicated LLM, which is trained to receive a history of breaches and their severity scores to produce both a summarization of cyber security information including those breaches as well as to provide recommendations to prioritize those breaches against each other to help the user.

13. A non-transitory storage medium including software that, upon execution by a processor, is configured to perform operations, comprising:

using an interactive cyber-security user-interface for cybersecurity components to receive a voice input from a user as a user input;

using the interactive cyber-security user-interface for the cybersecurity components to work with a set of two or more differently trained large language models (LLMs) to carry out tasks on behalf of the user input;

using the interactive cyber-security user-interface for the cybersecurity components to cooperate with the set of two or more differently trained LLMs, which are grouped together to operate as an orchestrated system to provide two or more different tasks wherein the set of two or more differently trained LLMs comprises at least two of the following task-dedicated LLMs:

(a) an API-integration task dedicated LLM trained to act as an assistant that submits data to at least one of i) a third-party service and ii) the cybersecurity components using training on how to integrate with an API of that third party service or cybersecurity component to obtain a collection of supplementary information;

(b) a search-syntax task dedicated LLM trained on a search syntax required by at least one of i) the third-party service and ii) the cybersecurity components to allow users to query in natural human speech via the search-syntax task dedicated LLM being trained to translate the query in the natural human speech into the search syntax required;

(c) a breach-summarization task dedicated LLM trained to be fed a history of model breaches and their severity scores and then the breach-summarization task dedicated LLM produces both a summarization of cyber security information including the model breaches as well as provides recommendations; and (d) a user-support task dedicated LLM trained to act as a first line of support for user inquiries to provide a suggested response to a cyber security issue; and using the interactive cyber-security user-interface for the cybersecurity components to cooperate with one or more of the cybersecurity components including i) a cyber security appliance with a cyber threat detect engine to detect a cyber threat in one or more of an email system, an Information Technology network, a cloud network, and any combination of these, ii) a proactive threat notification service to publicize new and ongoing cyber threats, iii) a cyber threat autonomous response engine to take one or more actions to mitigate a detected cyber threat, iv) a cyberattack simulator to simulate a cyberattack, v) a cyber-attack restoration engine to restore network components back to an operational state prior to the cyberattack, and vi) an artificial intelligence-based cyber threat analyst module to investigate a chain of two or more minor anomalies linked to each other over a time frame of examination spanning two or more days.

14. The non-transitory storage medium of claim 13, wherein the set of two or more differently trained LLMs includes an orchestrator LLM; wherein the operations further comprise using the orchestrator LLM to receive the user input of voice or text, and apply a language comprehension functionality on the user input to generate a consistent version of a request indicated by the user input; and feeding the consistent version of the request as an output to one or more of the task-dedicated LLMs to be invoked; wherein the orchestrator LLM is further trained to orchestrate the tasks performed by the task-dedicated LLMs.

15. The non-transitory storage medium of claim 14, wherein the orchestrator LLM has fine-tuned training; wherein the training of the orchestrator LLM starts with selecting an already trained LLM model into performing a task and then unlocking one or more layers and parameters of the orchestrator LLM and fine tuning a machine learning of the unlocked layers and parameter on new data to perform one of the different tasks.

\* \* \* \* \*